United States Patent [19]
Reitz et al.

[11] Patent Number: 5,938,978
[45] Date of Patent: Aug. 17, 1999

[54] INTERMITTENT PROGRAMMING OF ELECTROSETTABLE COMPOSITIONS

[75] Inventors: Ronald P. Reitz, Hyattsville; Charles H. Singer, Jr., Saint Inigoes; Vincent V. Manley, Ellicott City, all of Md.

[73] Assignee: The United States of America as represented by the Secretary of the Navy, Washington, D.C.

[21] Appl. No.: 08/859,414

[22] Filed: May 20, 1997

Related U.S. Application Data

[63] Continuation-in-part of application No. 07/810,548, Dec. 19, 1991, abandoned, application No. 07/826,207, Jan. 22, 1992, and application No. 08/107,047, Aug. 17, 1993, said application No. 07/810,548, is a continuation of application No. 07/584,836, Sep. 19, 1990, abandoned, which is a continuation-in-part of application No. 07/219,522, Jul. 15, 1988, abandoned, application No. 07/219,523, Jul. 15, 1988, abandoned, and application No. 07/405,178, Sep. 11, 1989, Pat. No. 5,194,181, said application No. 07/826,207, is a continuation of application No. 07/599,162, Oct. 17, 1990, abandoned, which is a continuation-in-part of application No. 07/219,523, said application No. 08/107,047, is a continuation of application No. 07/593,149, Oct. 5, 1990, abandoned, which is a continuation-in-part of application No. 07/405,178.

[51] Int. Cl.[6] .............................. H01B 1/20; B29C 35/02; B29C 39/00
[52] U.S. Cl. .................... 252/500; 252/519.33; 264/450; 264/451; 264/DIG. 5; 264/402
[58] Field of Search ....................... 252/500, 511, 252/512, 514, 518.1, 519.33; 264/10, 402, 450, 451, 494, 496, 104, DIG. 5

[56] References Cited

U.S. PATENT DOCUMENTS

| | | | |
|---|---|---|---|
| 4,193,956 | 3/1980 | Kalnins | 264/27 |
| 4,301,187 | 11/1981 | Burch . | |
| 4,407,054 | 10/1983 | Zipfel, Jr. . | |
| 4,423,191 | 12/1983 | Haven et al. . | |
| 4,441,875 | 4/1984 | Saito et al. . | |
| 4,707,231 | 11/1987 | Berger . | |
| 4,826,616 | 5/1989 | Tanino et al. . | |
| 4,857,244 | 8/1989 | Berger . | |
| 4,900,387 | 2/1990 | Johnson . | |
| 4,921,928 | 5/1990 | Tanino et al. . | |
| 5,190,624 | 3/1993 | Reitz | 204/59 R |
| 5,194,181 | 3/1993 | Reitz | 252/500 |
| 5,213,713 | 5/1993 | Reitz | 252/500 |
| 5,232,639 | 8/1993 | Reitz et al. | 264/22 |
| 5,279,870 | 1/1994 | Kester . | |
| 5,518,664 | 5/1996 | Reitz | 252/518 |

*Primary Examiner*—Mark Kopec
*Attorney, Agent, or Firm*—Howard Kaiser

[57] ABSTRACT

The invention features utilization of a single electrical power supply for intermittently electrifying one or more regions of an electrosettable compositional entity during the cure of that entity, thereby controllably altering one or more physical characteristics of each electrified region. A constant voltage-and-current power output is applied to each region; the amount of electric power which is applied to a region during an electrification period varies in accordance with the time duration of that period. The practitioner time-schedules the inventive intermittence in terms of duration, number, frequency and sequence of the regional electrification periods.

27 Claims, 16 Drawing Sheets

FIG. 4A
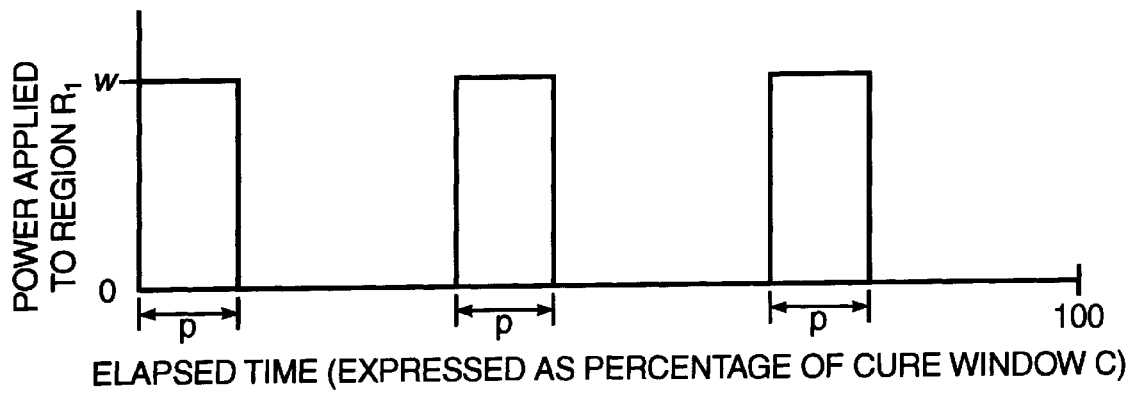
ELAPSED TIME (EXPRESSED AS PERCENTAGE OF CURE WINDOW C)
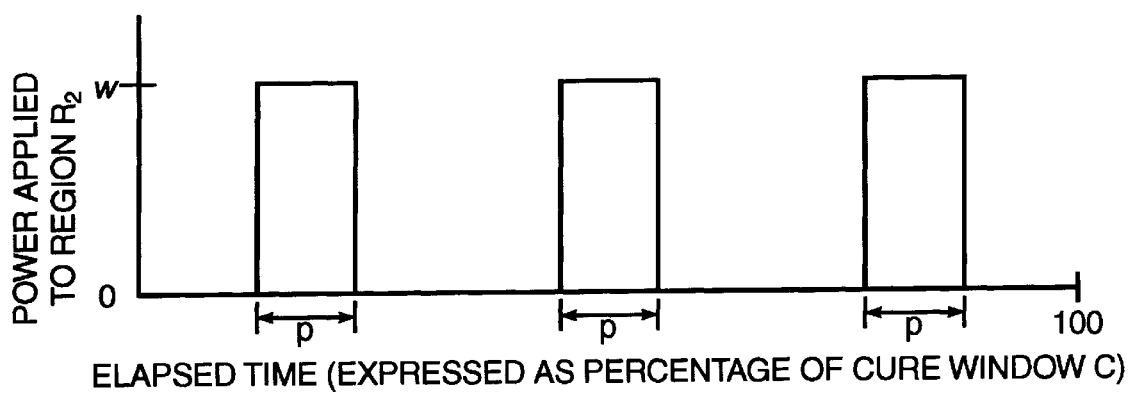
ELAPSED TIME (EXPRESSED AS PERCENTAGE OF CURE WINDOW C)
ELAPSED TIME (EXPRESSED AS PERCENTAGE OF CURE WINDOW C)

FIG. 4B
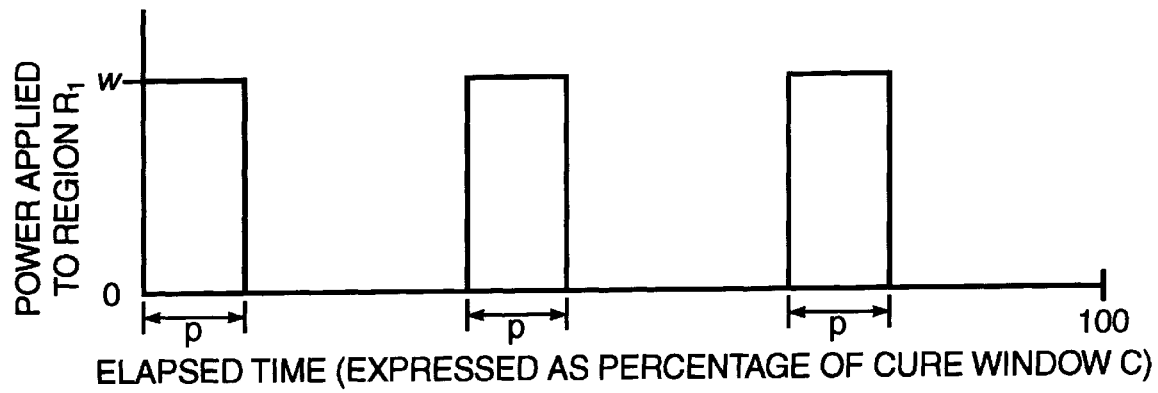
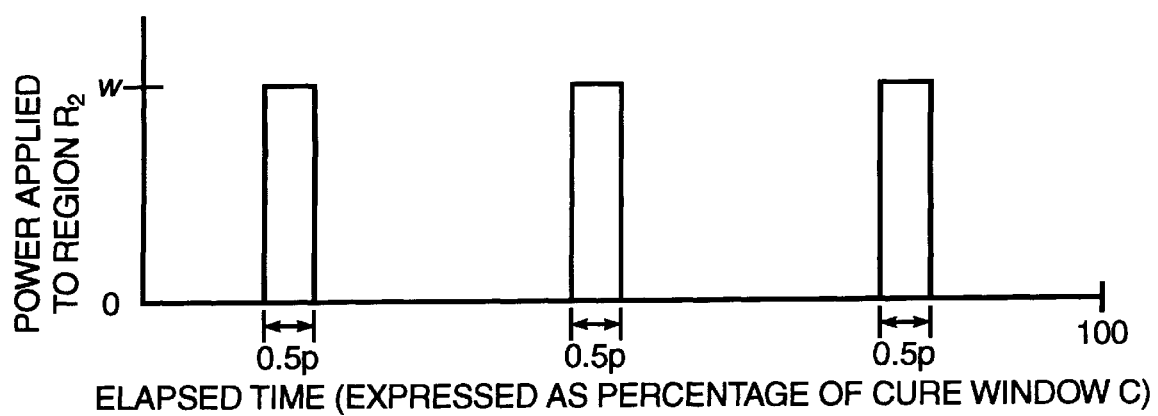
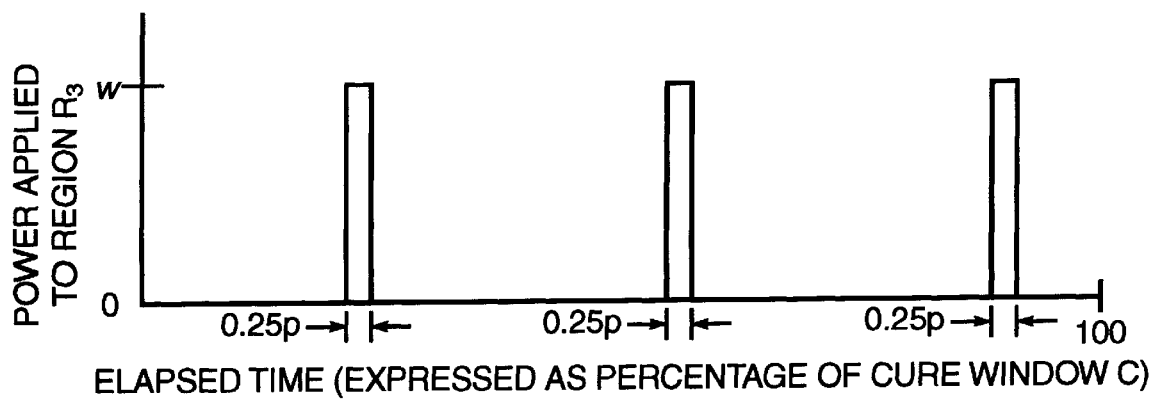

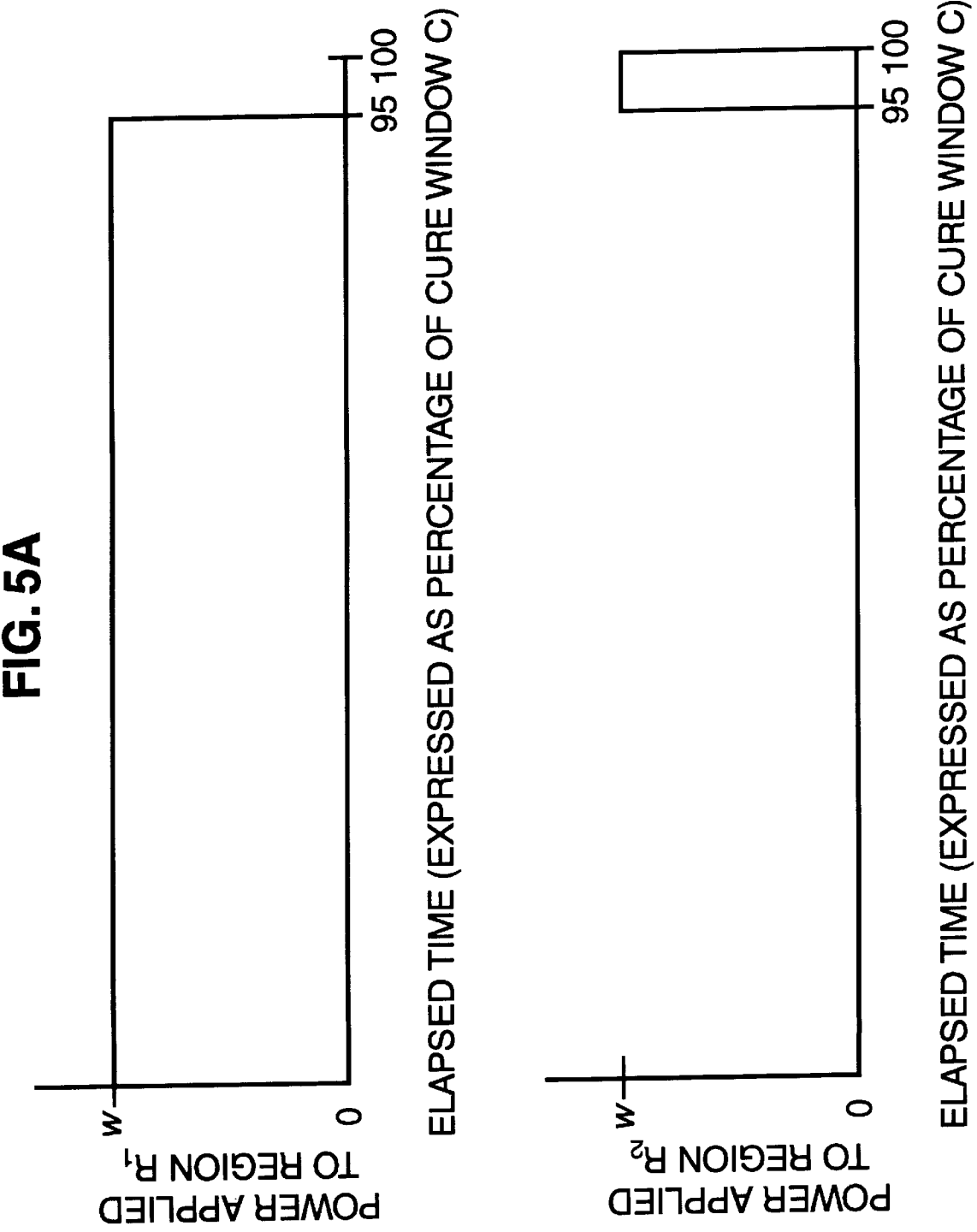

FIG. 5B
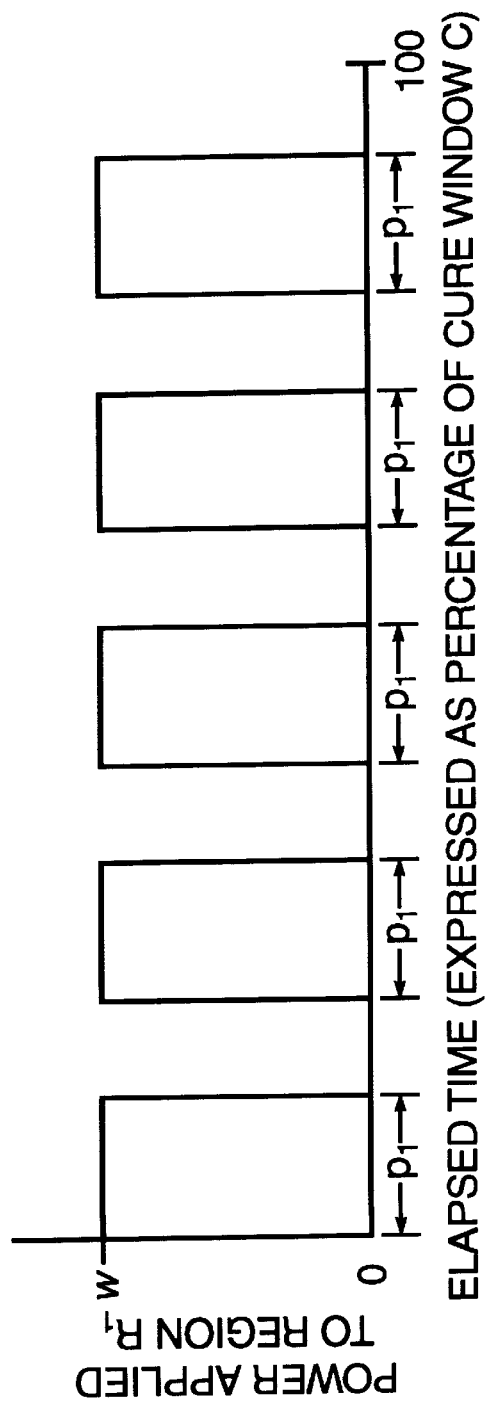
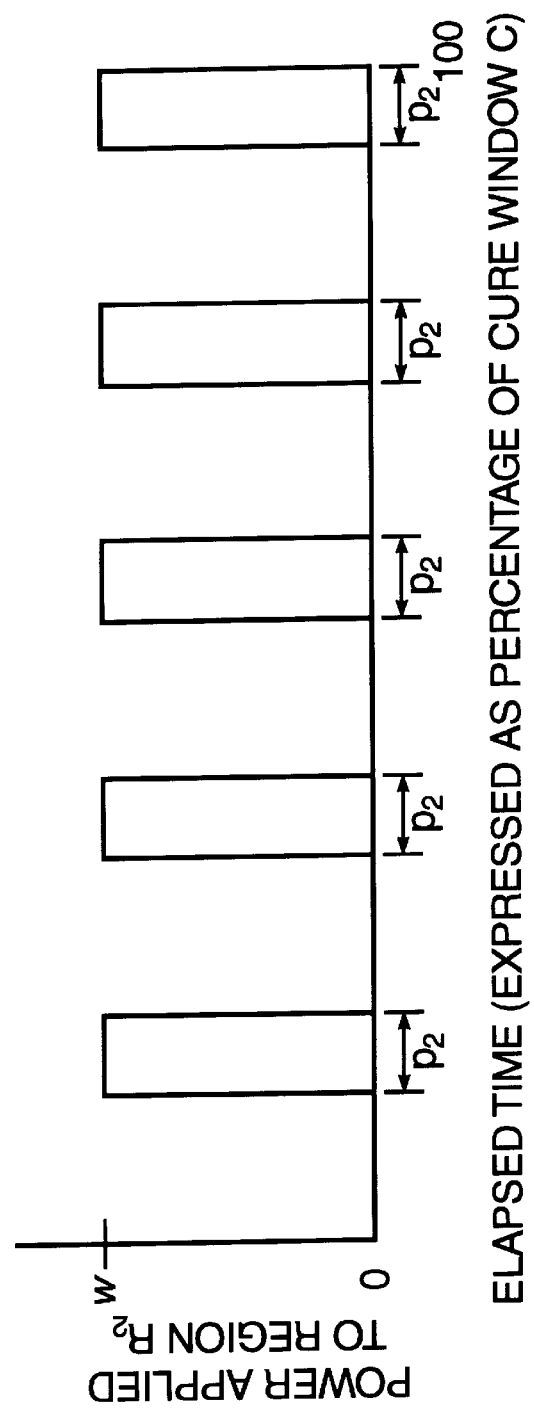

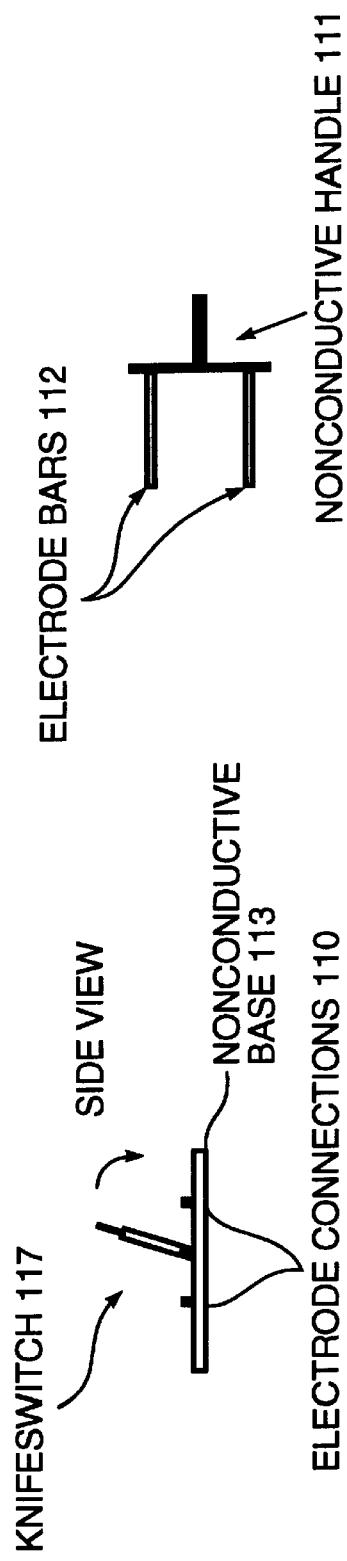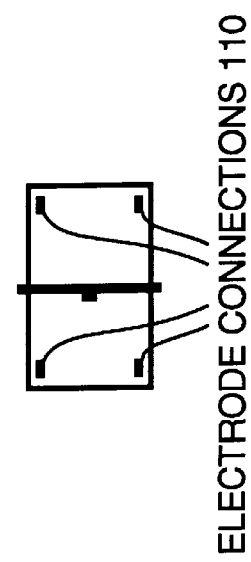

INTERMITTENT PROGRAMMING OF ELECTROSETTABLE COMPOSITIONS

CROSS-REFERENCE TO RELATED APPLICATIONS

This application is a continuation-in-part of patent application Ser. No. 07/810,548 filed Dec. 19, 1991 now abandoned, and a continuation-in-part of copending patent application Ser. No. 07/826,207 filed Jan. 22, 1992, and a continuation-in-part of copending patent application Ser. No. 08/107,047 filed Aug. 17, 1993.

Abovesaid patent application Ser. No. 07/810,548 filed Dec. 19, 1991 is a continuation of copending patent application Ser. No. 07/584,836 filed Sep. 19, 1990, now abandoned, which is a continuation-in-part of copending patent application Ser. No. 07/219,522 filed Jul. 15, 1988, now abandoned and a continuation-in-part of copending patent application Ser. No. 07/219,523 filed Jul. 15, 1988, now abandoned and a continuation-in-part of copending patent application Ser. No. 007/405,178 filed Sep. 11, 1989, now U.S. Pat. No. 5,194,181.

Abovesaid patent application Ser. No. 07/826,207 filed Jan. 22, 1992 is a continuation of patent application Ser. No. 07/599,162 filed Oct. 17, 1990, now abandoned, which is a continuation-in-part of copending patent application Ser. No. 07/219,523 filed Jul. 15, 1988, now abandoned.

Abovesaid patent application Ser. No. 08/107,047 filed Aug. 17, 1993 is a continuation of patent application Ser. No. 07/593,149 filed Oct. 05, 1990, now abandoned, which is a continuation-in-part of patent application Ser. No. 07/405,178 filed Sep. 11, 1989, now U.S. Pat. No. 5,194, 181.

This application is also related to patent application Ser. No. 08/311,632, now U.S. Pat. No. 5,518,664, which is a division of abovesaid patent application Ser. No. 07/810,548 filed Dec. 19, 1991.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to compositions and articles, and methods of making same, which involve the application of electrical power, more particularly to such compositions, articles and methods wherein one or more material properties are induced electrically.

"Electroset processing" (also referred to as "electrosetting") is the processing of a material by application of a controlled voltage and current through the material during cure. "Programmable" electroset processing is disclosed by Reitz in U.S. Pat. No. 5,518,664, incorporated herein by reference. According to Reitz '664, one or more end-product material properties of a "programmable" electroset composition are "programmably" modified via electroset processing. An "end-product" property is a property which is realized upon the conclusion of the programmable electroset processing, at the stage when the electroset composition has completely cured. Generally, the complete curing of an electroset composition entails the "setting" of the electroset composition so as to achieve some kind of solid state.

To elaborate, Reitz '664 teaches the selective "programmability" of electroset compositions by means of electrical processing during the cure of such compositions; electroset compositions are processed whereby at least one end-product property (e.g., density, compressibility, hardness, buoyancy, smoothness, adhesion or shape) is electrically programmed during curing. As disclosed by Reitz '664, an end-product property is "programmed" in the sense that the end-product property is altered in comparison with what such end-product property would be in the absence of exposure of the composition, during the curing of the composition, to an electric field which is caused by the maintained charging of at least two electrically conductive substrates.

In accordance with Reitz '664, at least two electrodes are utilized with respect to which the programmable electroset composition is interposed. Electrification of the electroset composition is commenced at some point after the composition has been appropriately positioned and while the composition is still fluid and has not fully cured; the electrification of the composition is sustained for a period of time during the curing of the composition Reitz '664 thus suggests continuity of electrification of the composition during cure of the composition; that is, once an electric power supply's electrical power output is intitially applied to the uncured composition, it continues to be applied to the composition until the desired result has been achieved, typically when the composition has substantially cured.

In addition to Reitz '664, the following disclosures, wherein Reitz is sole or joint inventor, pertain to the electroset or electrorheological realm of technology and are incorporated herein by reference: Reitz et al. U.S. Pat. No. 5,232,639; Reitz U.S. Pat. No. 5,213,713; Reitz U.S. Pat. No. 5,194,181; Reitz U.S. Pat. No. 5,190,624; copending patent application Ser. No. 07/810,548 filed Dec. 19, 1991 now abandoned; copending patent application Ser. No. 07/826,207 filed Jan. 22, 1992; and, copending patent application Ser. No. 08/107,047 filed Aug. 17, 1993.

In general, Reitz '664 and other disclosures mentioned hereinabove teach that a significant amount of electrical current, and a nonzero voltage, are applied to (and thus passed through) the electroset composition. Copending patent application Ser. No. 07/826,207 filed Jan. 22, 1992 discloses application to an electrosetting composition of an electric current having an electric current density of at least 0.667 milliamps per square inch. The preferred magnitude of the applied voltage is dependent upon the electroset composition which is being programmed and will usually range from several volts to tens of thousands of volts per centimeter thickness. It is manifest from these disclosures that, in any given instance of electroset processing, the electroset composition must have sufficient electrical conductivity for permitting such voltage and such current to pass therethrough during at least a portion of the duration of the electroset composition's curing.

Reitz '664 teaches the useful and advantageous application of such electrical power to a programmable electroset composition so as to effectuate programming of one or more end-product material properties of the composition. However, electroset processing per Reitz '664 may be less than optimally efficient for certain situations, especially those wherein an electroset composition is intended to be subjected to electroset processing whereby the resultant solidified object has programmed therein a plurality of regions (entire or partial portions) which, locationally, are discrete or distinct.

Dissatisfaction with the electroset processing of Reitz '664 may be heightened if two or more such regions to be programmed have distinctive attributes, i.e., are distinguishible not only in a spatial sense but in a material or qualitative sense, as well. Generally, it would be reasonable to expect, in the light of the teachings of Reitz '664, that electrification of materially/qualitatively distinctive regions would require application of different respective amounts of electrical power in terms of current, or voltage, or both current and voltage.

For instance, take the situation wherein two materially/qualitatively distinctive regions are sought to be programmably processed electrosettably. Each individual region would likely require a different amount of electrical energy (in particular, different voltage and current) to be brought to bear upon it. Pursuant to Reitz '664, a separate power supply would be necessitated for each region, each power supply having it own corresponding set of electrodes. During the curing of the composition, each region would be electrified separately on a continuous basis for some period of time; since each of the respective continuous electrifications would likely be maintained during a substantial portion of the composition's curative window, they would likely be effected at least partially concurrently.

Similarly, three materially/qualitatively distinctive regions would require three separate power supplies, four materially/qualitatively distinctive regions would require four separate power supplies, etc. Power supplies can be costly; the extravagance associated with the supplying of power will be compounded in accordance with the number of power supply units being implemented.

What if, for instance, a practitioner cannot afford or avail himself/herself of more than one power supply for purposes of electrosettably programing two materially/qualitatively distinctive regions? Following the teachings of Reitz '664, the practitioner could position three electrodes (e.g., electrically conductive plates) parallel to and spaced apart from each other, so that there are one "middle" electrode and two "end" electrodes. The programmable electroset composition would be poured into and fill each of the two spaces between the middle electrode and an end electrode.

Hence, pursuant to Reitz '664, there would be two regions, separated by the middle electrode, wherein the programmable electroset composition can be programmed; the two regions would be separately, approximately simultaneously and continuously electrified during the composition's cure, using apparatus inclusive of a common electrode (i.e., the middle electrode). It would in such manner be possible to devise, for a single power source, electrical power system controls which permit the programming of one region at, for example, 3,000 volts and the programming of the other region at, for example, 5,000 volts; however, this may not be feasible or economical.

Moreover, regardless of availability of power supplies, such a tri-electrode approach utilizing one power supply may be dictated by Reitz '664 when two materially/qualitatively distinctive regions are adjacent and so proximate as to prevent placement of two separate pairs of electrodes whereby each electrode pair corresponds to a separate power supply. In such situations, the sharing of the middle electrode would presuppose utilization of a shared power supply. Again, such an arrangement may be problematical.

It is thus seen that the programmable electrosettable processing per Reitz '664 of compositions having a plurality of regions, especially materially/qualitatively distinctive regions, can prove to be an expensive, impractical and/or unwieldy proposition.

SUMMARY OF THE INVENTION

In view of the foregoing, it is an object of the present invention to provide an improved method for electrosettably programming a plurality of locationally distinct/discrete regions in electroset compositions and compositional entities.

It is a further object of this invention to provide such a method which facilitates such programming when at least two such regions are materially/qualitatively distinctive regions.

Another object of the present invention is to provide such a method which facilitates such programming when at least two such regions are neighboring or contiguous.

It is another object of this invention to provide such a method which which facilitates such programming by permitting utilization of a single power supply, or utilization of fewer power supplies.

The present invention provides a process for programming at least one physical characteristic into at least one region of an electrosettable compositional entity. The inventive process comprises providing the electrosettable compositional entity in an uncured state, curing the electrosettable compositional entity, and, during the curing, intermittently applying electrical power to at least one region.

For some embodiments, this invention provides a process for curing an electroset composition so as to alter, for at least one region of the electroset composition, at least one end-product property. According to the inventive process, a quantity of electroset composition in an uncured state is provided. The electroset composition comprises a phase changing vehicle and an aggregate. The phase changing vehicle is both a dielectric and a polymer; the aggregate comprises particles which will polarize in an electric field. A region of the electroset composition is selected. The region is positioned between at least two electrically conductive substrates. The electrically conductive substrates are charged, thereby exposing the region to an electric field. The charging is maintained so as to establish an electric current within the region. The charging is ceased. At least once, the steps of selecting, charging, maintaining and ceasing are repeated.

In other words, in accordance with the inventive process, the electrification is reiterated at least one time with regard to the same region or a different region, the electrification including the steps of selecting, charging, maintaining and ceasing. Generally, in order to apply the electrification to a different region, that different region is positioned between the electrically conductive substrates. When the electroset composition is in a cured state, for at least one region at least one end-product property is altered by at least five percent with respect to that end-product property which would be obtained for the region, when the electroset composition is in a cured state, by a process for curing the electroset composition which does not include the charging.

For some embodiments, this invention provides a process for altering, for at least one region of a cured electroset article, at least one physical characteristic. The inventive process comprises providing an electroset material in an uncured state, the electroset material having an electrically activated blowing agent dispersed therein, curing the electroset material, and, during the curing, intermittently applying to at least one region an electric field sufficient to activate the blowing agent.

For many inventive embodiments, the end-product property or physical characteristic is selected from the group of end-product properties or physical characteristics consisting of density, compressibility, hardness, electrical resistivity, buoyancy, smoothness, adhesion and shape. For inventive embodiments wherein the end-product property or physical characteristic is selected from the group of end-product properties of physical characteristics consisting of density, compressibility, hardness, electrical resistivity and buoyancy, the alteration of such an end-product property or physical characteristic for a particular region is a function of the amount of electric current (e.g., associated with the applied electric field) within that region. For inventive embodiments wherein the end-product property or physical characteristic is selected from the group of end-product properties or physical characteristics consisting of smoothness and adhesion, the alteration of such an end-product property or physical characteristic for a particular region is an anisotropic function of the positioning of that region with respect to the electrically conductive substrates, or is an anisotropic function of the situation of that region with respect to the electric field. For inventive embodiments wherein the end-product property is shape, the positioning of a particular region includes placing at least a portion (inclusive of that region) of the electroset composition in an electric mold (e.g., which includes the electrically conductive substrates); the alteration of shape for a particular region is a function of the configuration of the electric mold.

In accordance with the present invention, at least one region of the electroset composition is electrified intermittently during cure. For many preferred embodiments, two or more different regions are electrified intermittently during cure. A region which is the entire quantity of electroset composition (or which is approximately or virtually so), or which is the entire electroset compositional entity (or which is approximately or virtually so), is styled herein a "global" region. A region which is appreciably less than "global" i.e., appreciably less than the entire quantity of electroset composition or the entire electroset compositional entity, is styled herein a "partial" region.

The terms "intermittent," "intermittence" and "intermittently," as used herein in conjunction with terms such as "programming," "programmed," "electrifying," "electrified" and "electrification," refer to the inventive practice of at least one cycle (or sequence) of three intervals, wherein the first interval is a period of continuous application of electrical power to an electroset composition (i.e., a global region) or some portion thereof (i.e., a partial region), the second interval is a period of cessation of such application of electrical power, and the third interval is a period of continuous application of electrical power to such electroset composition (i.e., global region) or some same or different portion (i.e., partial region) thereof.

Some degree of electrification takes place within a first selected region during the first interval, such electrification ceases during the second interval, and some degree of electrification (which is the same as or different from the electrification which has taken place within the first selected region during the first interval) takes place within a second selected region (which is the same as or different from the first selected region) during the third interval. According to this invention, the degree of electrification, in terms of voltage and current, can advantageously be varied from region to region by simply varying the duration of the corresponding electrification interval.

In other words, the term "intermittence" (as well as other forms of the term) is intended herein to convey the existence of at least one repetition of a period of continuous application of electrical power, following an intermission of said application, with respect to some region (either identical to or different from a previous region) of an electroset composition. Each such period of continuous electrification is referred to herein as a "time-step."

Hence, inventive intermittence implies the occurrence of at least two time-steps and at least one interlude between the two time-steps. The degree of electrical power for a given time-step is a function of the duration of that time-step, the duration being either equal to or unequal to that of a previous time-step.

The inventive method of intermittent programming can reduce costs, most notably for embodiments involving a plurality of regions, because the same electric power supply can be used to provide the electric programming power for each of the regions. Inventive "plural-region intermittence" is particularly advantageous when two or more regions are materially/qualitatively distinctive regions and hence would probably require different magnitudes of electrification. The inventive intermittence methodology can thus be beneficially practiced for manufacturing goods having plural regions, especially for those having a plural number of materially/qualitatively distinctive regions.

The inventive intermittent programming facilitates programming of plural regions using a single power supply. According to this invention, the voltage-and-current power output need not be varied in order to program each of a plurality of regions; instead, the amount of electric power applied to a particular region can be varied by simply varying the total time duration wherein the electric power is applied to that region.

In inventive practice, the electrification duration for a given region is the overriding variable which can be selected and defined in terms of certain parameters. The time-step frequency(ies) and/or time-step duration(s) and/or time-step sequence(s) and/or number(s) of time-step repetitions can be suitably and selectively varied for each region.

Accordingly, the inventive method of intermittent programming represents a significant alternative to the method of continuous programming disclosed by Reitz '664. With respect to a given region, the present invention prescribes variation of time duration of electrification, rather than variation of voltage and/or current. The inventive intermittent programming permits one power supply to be used when a plurality (even a multiplicity) of regions of an object are to be programmed.

Moreover, the present invention obviates the need to change the voltage output or current output of the power supply. This invention permits a single voltage-and-current output to be applied to each of one or more regions, while at the same time permitting the total amount of electrical energy applied to each region to be varied to a desired quantity Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawing, wherein like numbers indicate the same or similar components, and wherein:

FIG. 4A, FIG. 4B and FIG. 4C are graphical representations of time-step electrification schedules for respective illustrative embodiments of inventive triple-region intermittence.

FIG. 5A and FIG. 5B are graphical representations of time-step electrification schedules for respective illustrative embodiments of inventive double-region intermittence

FIG. 7A is a side elevation view of an embodiment of a knifeswitch in accordance with the present invention.

FIG. 7B is a plan view of the movable component of the knifeswitch shown in FIG. 7A.

FIG. 7C is a top plan view of the knifeswitch shown in FIG. 7A, shown in the closed position.

FIG. 7D is a top plan view of the knifeswitch shown in FIG. 7A, shown in the open position.

DETAILED DESCRIPTION OF THE INVENTION

Figure 1:
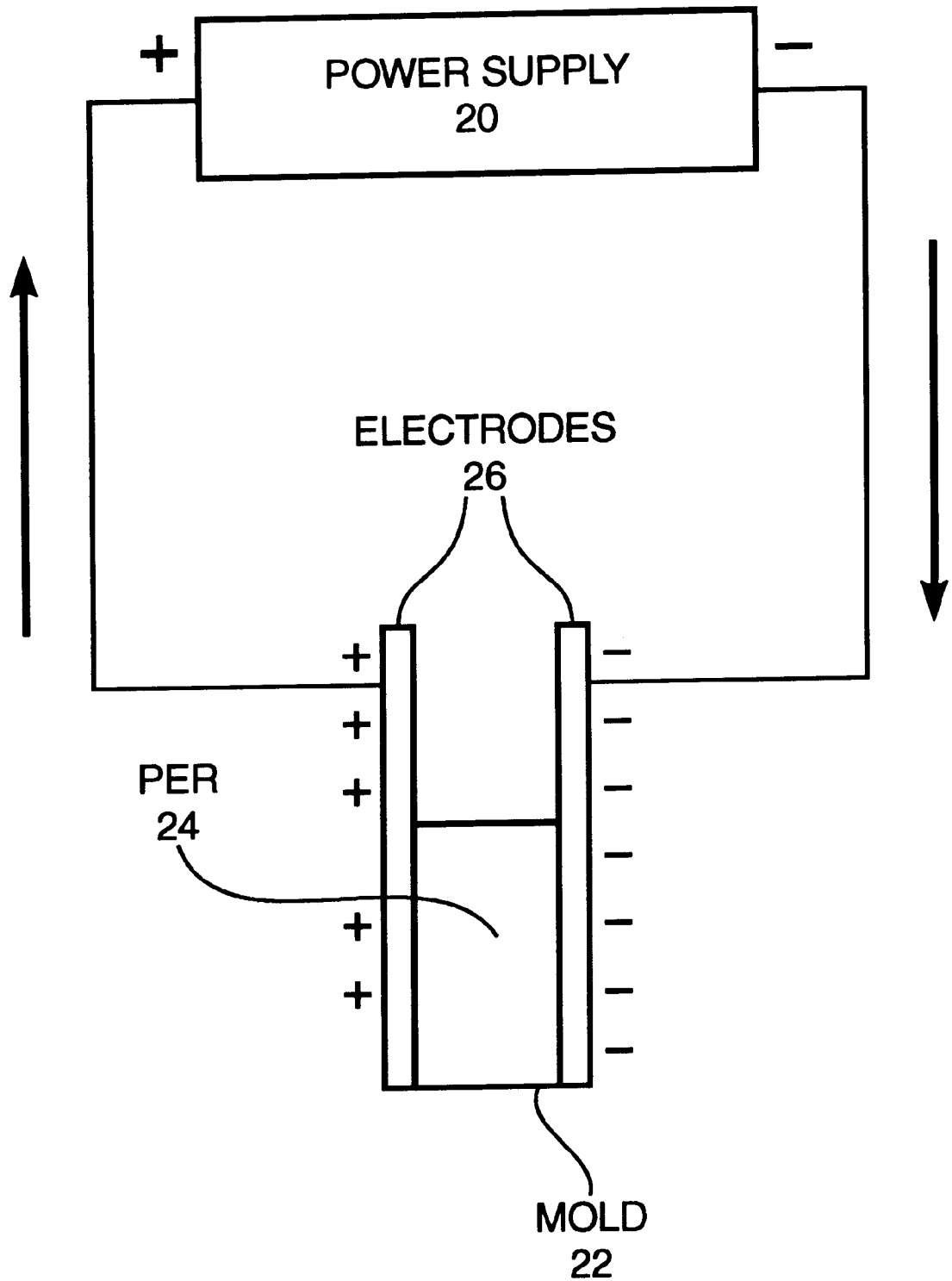
FIG. 1 is a diagrammatic representation of a power supply which is circuited with a programmable electroset composition for purposes of performing an embodiment of electrosetting in accordance with the present invention.

Referring now to FIG. 1, illustrated is a diagrammatically representative arrangement for practicing electrosetting, whether "continuously" according the Reitz '664 or "intermittently" according to the present invention. Power supply 20 is in circuit with a quantity of programmable electroset resin ("PER") 24 in electroset mold 22 having electrodes 26. Fundamentally, electrosetting is electrosetting: A material (or portion thereof) is processed by applying a controlled voltage-and-current through the material (or portion thereof) during the curing of the material (or portion thereof).

Reitz '664 teaches performance of electroset processing on a programmable electroset composition such as PER 24 by applying a "continuous" electric voltage and current to PER 24 during cure, while PER 24 is still in its fluid casting state. The electrosetting causes physical and/or chemical changes to occur within PER 24 during cure. This alters the properties of the final, cured end-product PER 24 compositional entity from those properties which would have been rendered if there had been no electric voltage and current applied to PER 24.

According to Reitz '664, electric power is applied to PER 24 "continuously" in the sense that, once the electric power is applied to PER 24, the electric power remains applied to PER 24 until the total programming energy has been input into PER 24; usually, the electric power is input for the duration commencing upon initial application of electrification and terminating at about the time that the PER 24 material has set.

Figure 2:
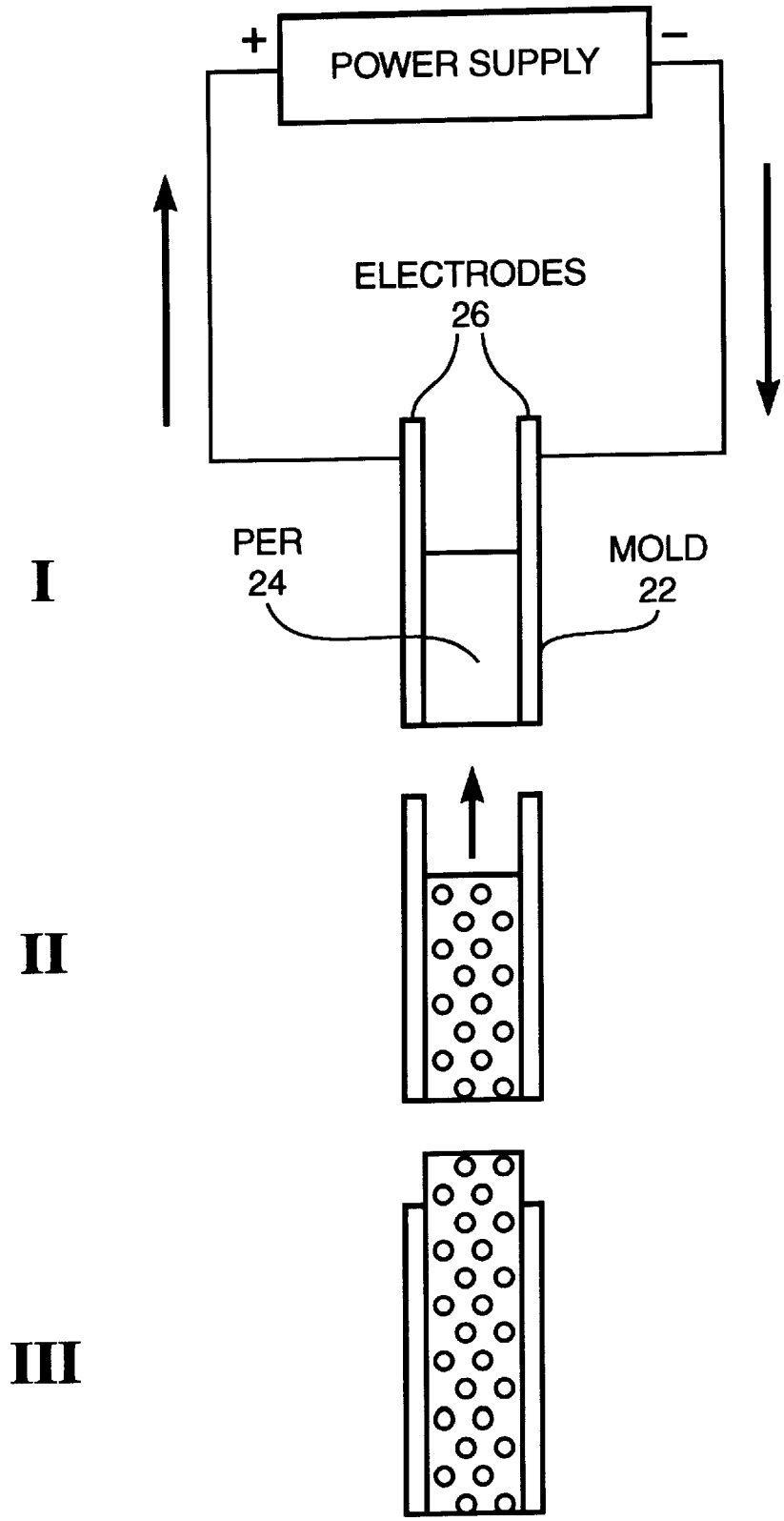
FIG. 2 is a diagrammatic representation which incorporates that which is shown in FIG. 1 and which illustrates an embodiment of an inventive method of programming density and/or compressibility by means of electrical foaming of a programmable electroset composition.

An example of a PER which is electrically programmable is one which is electrically foamable. With reference to FIG. 2, for some (not all) such PERs, the programming therein of density and compressibility is accomplished as follows: (I) Electric energy is applied to and thereby heats PER 24, the electroset casting fluid. (II) At a critical temperature, a constituent of PER 24 undergoes phase change from fluid to gas, creating bubbles. (III) The rest of the resin permanently solidifies around the bubbles, thus making a foamed rubber-like object/material.

For many PERs, the base resins are thermosetting compounds. That is to say that the rate of cure is dependent upon the temperature of the composition. For thermosetting compositions, the higher the temperature, the faster the cure (and set). The teachings of Reitz '664 have been successfully applied to demonstrate that the overall density and compressibility of some PERs can be programmed into an article through electrical foaming of the article.

Reitz '664 is valuable and propitious for many manufacturing applications; nevertheless, the continuous processing of Reitz '664 can be inventively improved upon for many manufacturing applications.

Figure 3:
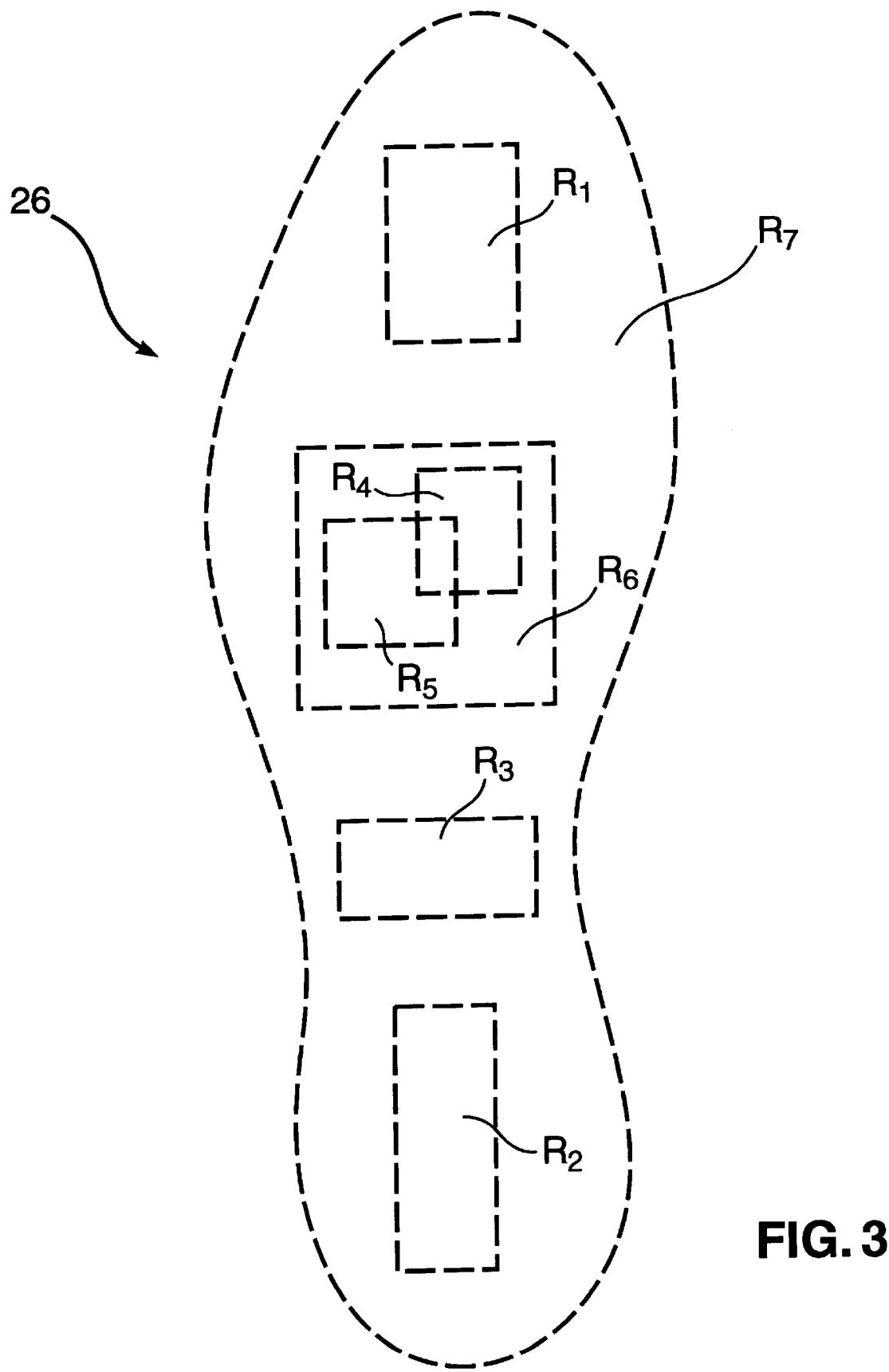
FIG. 3 is a diagrammatic top plan view of a left shoe pad which is the subject of an embodiment of inventive intermittent programming.

Reference now being made to FIG. 3, shoe pad 26 is an article of manufacture which lends itself to electroset processing and which can especially benefit from the inventive improvements of electroset processing. For purposes of illustration, shoe pad 26 is shown to have seven regions, viz., region $R_1$, region $R_2$, region $R_3$, region $R_4$, region $R_5$, region $R_6$ and region $R_7$. Region $R_7$ is a global region, i.e., the entire shoe pad 26. Region $R_1$, region $R_2$, region $R_3$, region $R_4$, region $R_5$ and region $R_6$ are partial regions of shoe pad 26. Although seven regions are delineated in FIG. 3, it can be expected that many inventive applications will involve the programming of another number of regions for a particular article. Moreover, although the six partial regions are depicted in FIG. 3 as rectangular in cross-section, in inventive practice it should be generally understood that, depending on application requirements, any electrosetting entity region which is selected for intermittent programming can have any cross-sectional shape.

Two or more different regions of a compositional entity are said herein to be "locationally discrete" if such regions define respective compositional portions which are mutually exclusive, i.e., are nonintersecting. Partial regions can be locationally discrete with respect to each other but not with respect to global regions.

In FIG. 3, region $R_1$ is locationally discrete with respect to region $R_2$, region $R_3$, region $R_4$, region $R_5$ and region $R_6$. Region $R_2$ is locationally discrete with respect to region $R_1$, region $R_3$, region $R_4$, region $R_5$ and region $R_6$. Region $R_3$ is locationally discrete with respect to region $R_1$, region $R_2$, region $R_4$, region $R_5$ and region $R_6$. Region $R_4$ is locationally discrete with respect to region $R_1$, region $R_2$ and region $R_3$. Region $R_5$ is locationally discrete with respect to region $R_1$, region $R_2$ and region $R_3$. Region $R_6$ is locationally discrete with respect to region $R_1$, region $R_2$ and region $R_3$.

Two or more different regions of a compositional entity are said herein to be "locationally distinct" if such regions define different respective compositional portions, albeit the different portions completely or partially (incompletely) intersect. As meant herein, locational distinctness and locational discreteness are exclusively disjunctive conditions. Global and/or partial regions can be locationally distinct with respect to each other.

In FIG. 3, region $R_7$ is locationally distinct with respect to region $R_1$, region $R_2$, region $R_3$, region $R_4$, region $R_5$ and region $R_6$. Region $R_1$, region $R_2$, region $R_3$ and region $R_6$ are each locationally distinct with respect to region $R_7$ only. Region $R_4$ is locationally distinct with respect to region $R_5$, region $R_4$ and region $R_7$. Region $R_5$ is locationally distinct with respect to region $R_4$, region $R_6$ and region $R_7$. Region $R_6$ is locationally distinct with respect to region $R_4$, region $R_5$ and region $R_7$.

"Incomplete intersection" of two locationally distinct regions implies partial coincidence or overlap of the two regions. In FIG. 3, region $R_4$ and region $R_5$ incompletely intersect each other.

"Complete intersection" of two locationally distinct regions implies an encompassing of a smaller ("minor") region within a larger ("major") region. "Global-partial intermittence" is analogous to "partial intermittence" of two "locationally distinct" regions in that the respectively electrified compositional portions completely intersect. In FIG. 3, region $R_7$ is the major region which completely intersects six minor regions, viz., region $R_1$ region $R_2$, region $R_3$, region $R_4$, region $R_5$ and region $R_6$. Region $R_6$ is the major region which completely intersects two minor regions, viz., region $R_4$ and region $R_5$.

Two different partial regions of an electroset compositional entity are said herein to be "materially/qualitatively distinctive" (sometimes abbreviated herein "distinctive") if they are characterized by distinctiveness with respect to at least one end-product material property which has been, or is being, respectively programmed into one partial region versus the other partial region. Similarly, a global region and a partial region are said herein to be "materially/qualitatively distinctive" (or simply "distinctive") if they are characterized by distinctiveness with respect to at least one end-product material property which has been, or is being, respectively programmed into the global region versus the partial region.

A "unique region" is one which is both locationally discrete and materially/qualitatively distinctive in relation to every other programmed (or to-be-programmed) region of a programmably processed (or programmably to-be-processed) electroset compositional entity.

As an example of end-product property "distinctiveness" for each of at least two regions, it may be desirable to program a categorically different end-product property (e.g., compressibility versus smoothness) for each region. As another example of end-product property "distinctiveness" for each of at least two regions, it may be desirable to program for each region the categorically same end-product property of a different nature, character or degree (e.g., high compressibility versus low compressibility).

"Global-global intermittence" includes at least one cycle/sequence of a period of electrification of a global region, followed by a period of intermission, followed by a period of resumption of electrification of a global region. In other words, global-global intermittence includes at least two global region time-steps. In FIG. 3, global-global intermittence includes a plurality of time-steps applied to region $R_7$.

"Partial-partial intermittence" includes at least one cycle/sequence of a period of electrification of a partial region, followed by a period of intermission, followed by a period of electrification of either the same partial region or of another partial region. In other words, partial-partial intermittence includes at least two partial region time-steps. The first and second partial regions can be the identical partial region or different partial regions, wherein the first and second regions are locationally discrete or locationally distinct with respect to each other.

In FIG. 3, partial-partial intermittence includes a plurality of time-steps wherein each time-step can be applied to any of region $R_1$, region $R_2$, region $R_3$, region $R_4$, region $R_5$ and region $R_6$. For instance, partial-partial intermittence can include a time-step as to region $R_1$ and a time-step as to region $R_1$; or, a time-step as to region $R_1$ and a time-step as to region $R_2$; or, a time-step as to region $R_1$ and a time-step as to region $R_3$; etc.

"Global-partial intermittence" (synonymously termed "partial-global intermittence") includes at least one cycle/sequence of a period of electrification of a global region, followed by a period of intermission, followed by a period of resumption of electrification of a partial region. Alternatively and vice versa, global-partial intermittence includes at least one cycle/sequence of a period of electrification of a partial region, followed by a period of intermission, followed by a period of resumption of electrification of a global region. In other words, global-partial intermittence includes at least one global region time-step and at least one partial region time-step.

In FIG. 3, global-partial intermittence includes a plurality of time-steps wherein at least one time-step is applied to region $R_7$ and at least one time-step is applied to any of region $R_1$, region $R_2$, region $R_3$, region $R_4$, region $R_5$ and region $R_6$. For instance, global-partial intermittence can include a time-step as to region $R_7$ and a time-step as to region $R_1$; or, a time-step as to region $R_7$ and a time-step as to region $R_2$; or, a time-step as to region $R_7$ and a time-step as to region $R_3$; etc.

In accordance with the present invention, intermittence can be either "intraregionally repetitive," or "interregionally repetitive," or both "intraregionally repetitive" and "interregionally repetitive." Intermittence is said herein to be "intraregionally repetitive" if it includes at least one cycle/sequence of a period of electrification of a region, an intermission of electrification of the same region, and a resumed period of electrification of the same region. In other words, intraregional repetition includes at least two regional time-steps which pertain to the same region. Intraregional repetition can be with respect to the global region or with respect to the same partial region. Intermittence is said herein to be "interregionally repetitive" if it includes at least one cycle/sequence of a period of electrification of a first region, an intermission of electrification of the first region, and a resumed period of electrification of a second region. In other words, interregional repetition includes at least two regional time-steps each of which pertains to a different region. Interregional repetition can be with respect to a global region and a partial region, or with respect to two different partial regions. By definition, global intermittence implies intraregional repetition with respect to the global region.

Accordingly, inventive intermittence implies at least one cycle or sequence of the following events which take place, in association with at least one region of an electroset composition, during the curative period thereof (i.e., while the electroset composition is curing and is not yet fully cured): Electrical power is applied to a first region for a measurable period of time. Then, the electrical power ceases to be applied to that region for a measurable period of time. Then, the electrical power is again applied, for a measurable period of time, to that region (i.e., intraregionally repetitively) or to another region (i.e., interregionally repetitively)

In inventive practice, the durations of the time periods of electrificational activity and intermission are selectively and limitlessly variable, subject to the necessary condition that the total time commencing with the initial time-step (period of electrificational activity) and terminating with the final time-step (period of electrificational activity) not exceed the overall time required for the composition to cure. In addition, it is preferable for many inventive embodiments that each time period, especially each time-step, be of definitely ascertainable duration, i.e., of sufficient duration to be reasonably measurable by a conventional highly precise timing device. It can be reasonably expected that, for the vast majority of inventive embodiments, each electrification period and each intermission period will equal or exceed one millisecond, which is a quite measurable time span.

Characterized herein are two genres of inventive regional intermittence, viz., "one-region" (or "single-region") intermittence and "plural-region" intermittence. Also characterized herein are a theoretically infinite number of inventive subgenres of the plural-region intermittence genre, viz., "two-region" (or "double-region") intermittence, "three-region" (or "triple-region") intermittence, "four-region" (or "quad-region") intermittence, "five-region" (or "quint-region") intermittence, "six-region" (or "hexa-region") intermittence, "seven-region" (or "hepta-region") intermittence, "eight-region" (or "octa-region") intermittence, "nine-region" (or "nona-region") intermittence, "ten-region" (or "deca-region") intermittence, etc. These genres and subgenres are characterized in terms of the number of regions being programmed.

Inventive single-region intermittence is necessarily intraregionally repetitive. Inventive plural-region intermittence is necessarily at least interregionally repetitive and can be both interregionally repetitive (with respect to at least two regions) and intraregionally repetitive (with respect to at least one region). In other words, inventive plural region intermittence can be either (i) interregionally repetitive but not intraregionally repetitive, or (ii) both interregionally repetitive and intraregionally repetitive.

Still referring to FIG. 3, as an example according to inventive single-region intermittence, electrification is applied to region $R_1$, followed by an intermission. During the intermission with respect to region $R_1$, electrification is unapplied with respect to any region of the electroset composition. In typical inventive practice, this is accomplished by turning off the electrical power. At some point, the electrical power is again turned on and the electrification is reapplied to region $R_1$, and there is thus intraregional (electrificational) repetition with respect to region $R_1$.

Inventive single-region intermittence can generally be distinguished from inventive plural-region intermittence by what occurs during intermission (i.e., the respite or cessation of electrification) with respect to the first region (e.g., region $R_1$). According to inventive plural-region intermittence, electrification is applied sequentially with respect to at least two regions. In other words, during the intermission with respect to region $R_1$, electrification is applied sequentially with respect to one or more other regions (e.g., "region $R_2$," "region $R_3$," "region $R_4$," etc.) of the electroset composition.

As an example according to inventive two-region intermittence, during the intermission with respect to region $R_1$, electrification is applied with respect to region $R_2$ of the electroset composition. In typical inventive practice, the electrical power is not turned off during this intermission with respect to region $R_1$; rather, application of the same electrical power is shifted to region $R_2$. There is thus interregional repetition with respect to region $R_1$ and region $R_2$. At some point, application of the same electrical power can be shifted from region $R_2$ back to region $R_1$, and there would thus also be intraregional repetition with respect to region $R_1$. If application of the electrical power is then shifted from region $R_1$ back to region $R_2$, there is also intraregional repetition with respect to region $R_2$.

Varying this example to inventive three-region intermittence, during the intermission with respect to region $R_1$, electrification is applied with respect to region $R_2$ of the electroset composition and subsequently to region $R_3$ of the electroset composition. There is thus interregional repetition with respect to region $R_1$, region $R_2$ and region $R_3$. Again, in typical inventive practice, the electrical power is not turned off during this intermission with respect to region $R_1$; rather, application of the same electrical power is shifted to region $R_2$ and then to region $R_3$.

To elaborate with regard to this example of three-region intermittence, electrification is first applied to region $R_1$. Then there is an intermission with respect to region $R_1$. During this region $R_1$ intermission, electrification is applied, using the same electrical power, to region $R_2$. Then, application of electrification region $R_2$ is ceased. During this region $R_2$ intermission and still during the region $R_1$ intermission, electrification is applied, still using the same electrical power, to region $R_3$.

At some point, application of the same electrical power can be shifted from region $R_3$ back to region $R_1$, and there would thus also be intraregional repetition with respect to region $R_1$. At this juncture, the application of electrical power can be shifted from region $R_1$ back to another region. If the electrical power is then shifted from region $R_1$ back to region $R_2$, there is also intraregional repetition with respect to region $R_2$. If the electrical power is then shifted back from region $R_1$ to region $R_3$, there is also intraregional repetition with respect to region $R_3$. If the electrical power is then shifted back from region $R_1$ to region $R_2$ and then to region $R_3$, or to region $R_3$ and then to region $R_2$, there is also intraregional repetition with respect to region $R_2$ and intraregional repetition with respect to region $R_3$.

Figure 4C:
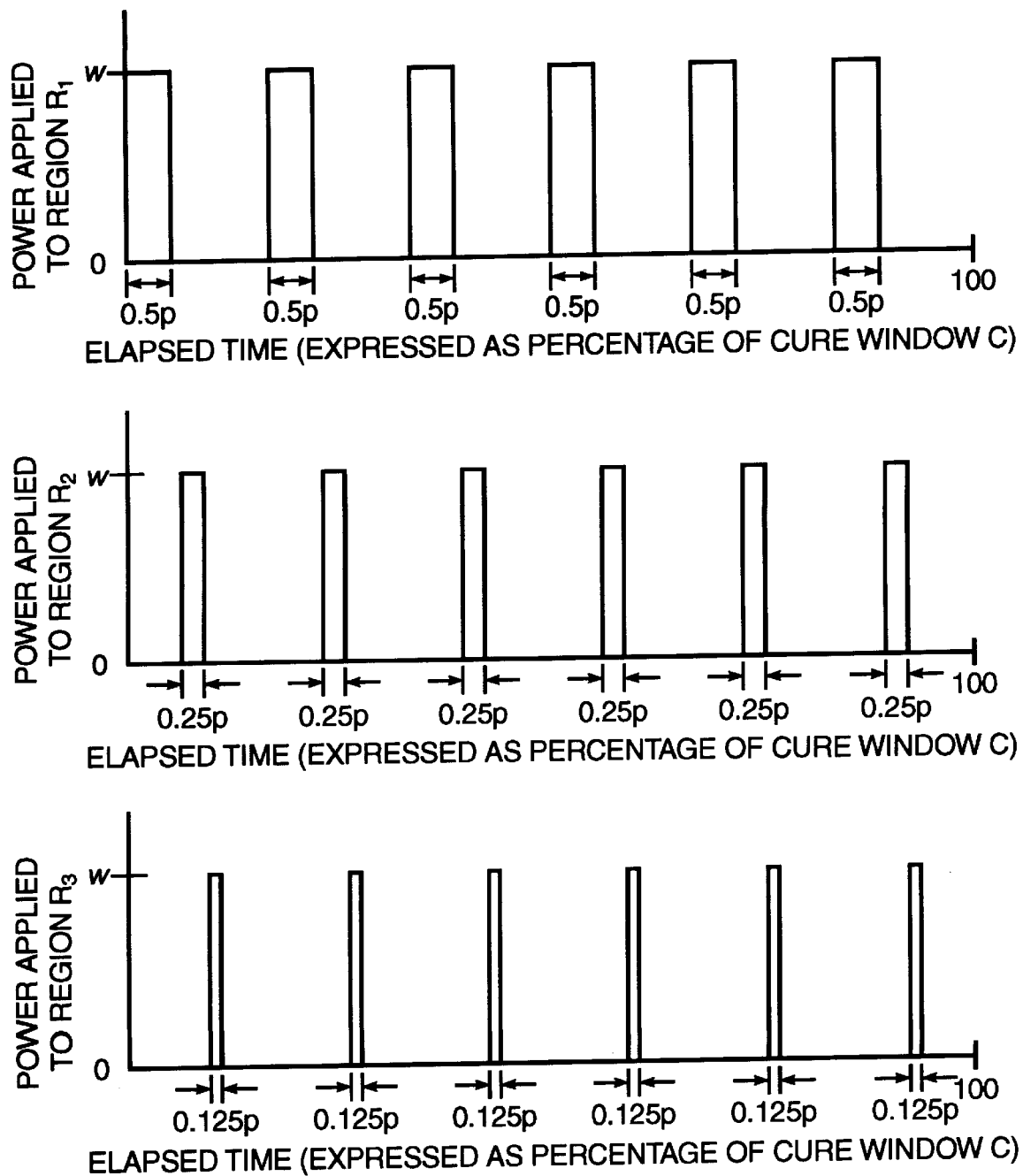

Still with reference to FIG. 3 and also with reference to FIG. 4A, FIG. 4B and FIG. 4C, two or more selected regions, in comparison with each other, can be distinctive or indistinctive. A selectively standardized magnitude of power w is to be applied for electrification purposes throughout the inventive intermittent electrosetting process; hence, the total electrical power output applied to a given region is basically a function of the total time during which power w is applied to that region.

If any given selected regions, in comparison with each other, are materially/qualitatively identical (indistinctive), the same magnitude of electrification, in terms of both current and voltage, will be applied to each region for the same total duration of time; hence, each region will be subjected to the same overall electrification. For instance, let us assume that three selected regions, viz., region $R_1$, region $R_2$ and region $R_3$, are all indistinctive. Among region $R_1$, region $R_2$ and region $R_3$, a magnitude w of electric power (e.g., expressed in wattage) can be applied during the cure window c to each region in equal numbers of time-steps of equal duration; e.g., as shown in FIG. 4A, electrical power magnitude w can be applied: to region $R_1$ in three intraregional time-steps, each time-step being of specific time period p; to region $R_2$ in three intraregional time-steps, each time-step being of specific time period p; and, to region $R_3$ in three intraregional time-steps, each time-step being of specific time period p.

On the other hand, if any given selected regions, in comparison with each other, are materially/qualitatively distinctive, the same magnitude of electrification, in terms of both current and voltage, will need to be applied to each region for a different total duration of time; in this manner, each region will be subjected to a different overall electrification. For instance, let us assume that three selected regions, viz., region $R_1$, region $R_2$ and region $R_3$, are all distinctive. Among region $R_1$, region $R_2$ and region $R_3$, magnitude w of electric power can be applied, as shown in FIG. 4B: to region $R_1$ in three intraregional time-steps, each time-step being of specific time period p; to region $R_2$ in three intraregional time-steps, each time-step being of specific time period 0.5 p; and, to region $R_3$ in three intraregional time-steps, each time-step being of specific time period 0.25 p. Alternatively, as shown in FIG. 4C, equivalent electric power w can be applied: to region $R_1$ in six intraregional time-steps, each time-step being of specific time period 0.5 p; to region $R_2$ in six intraregional time-steps, each time-step being of specific time period 0.25 p; and, to region $R_3$ in six intraregional time-steps, each time-step being of specific time period 0.125 p.

Other alternatives among three selected regions, viz., region $R_1$, region $R_2$ and region $R_3$, are readily apparent. For instance, assume that region $R_1$ and region $R_2$ are indistinctive, and that region $R_3$ is distinctive vis-a-vis, region $R_1$ and region $R_2$. Equivalence of total power output applied to each of region $R_1$ and region $R_2$ can be achieved in any number of ways. It may be practical for many inventive embodiments to simply apply electrical power w to each of region $R_1$ and region $R_2$ in an equal number of time-steps, each time-step being of equal duration. On the other hand, it may be propitious, in the context of the overall inventive electrification scheme, to somehow contradistinguish, in terms of both time-step number and time-step duration, the application of electrical power w to region $R_1$ versus the application of electrical power w to region $R_2$, nonetheless achieving equivalence of total power output applied to each of region $R_1$ and region $R_2$.

Continuing with this example of two indistinctive regions $R_1$ and $R_2$ and one distinctive region $R_3$, one possible approach would involve the application of electrical power w to each of region $R_1$ and region $R_2$ in an equal number of durationally equal time-steps, and the application of electrical power w to region $R_3$ whereby the number of time-steps and/or the duration of at least one time-step is differentiated; thus, the total electrical power output which is applied to region $R_1$ would equal the total electrical power output which is applied to region $R_2$ and would not equal the total electrical power output which is applied to region $R_3$. There are multitudinous possible inventive time-step schedules according to which equivalent power can be applied to region $R_1$ and region $R_2$ and nonequivalent power applied to region $R_3$.

In general, inventive one-region intermittency can be accomplished by applying power output w to a region, then ceasing to apply power output w to that region, then again applying power output w to that same region, and so on. Inventive two-region intermittency can be accomplished by applying power output w to a first region, then applying power output w to a second region, then applying power output w to the first region, then applying power output w to the second region, and so on. Inventive three-region intermittency can be accomplished by applying power output w to a first region, then applying power output w to a second region, then applying power output w to a third region, then applying power output w to the first region, then applying power output w to the second region, then applying power output w to the third region, and so on.

There are innumerable alternatives in inventive practice; the inventive possibilities are endless. In light of the disclosure herein, the ordinarily skilled artisan should readily appreciate the multifarious inventive combinational possibilities in terms of regional number, regional configuration and/or time-step electrification schedule.

In inventive practice the total duration during which power w is to be applied to each of the selected regions is the basic factor to be considered by the practitioner for establishing a time-step schedule for a given inventive application; however, the practitioner must consider other factors. Most notably, in addition to the total duration of application of power w corresponding to each selected region, the timing of the application of power w corresponding to each selected region is a paramount consideration.

In order to effectively practice inventive intermittent programming, the practitioner must be knowledgeable about the PER 24 to be subjected thereto. The fundamental reason for this necessity of understanding is that the practitioner has a limited time frame (i.e., during cure) during which he or she has the opportunity to effectuate inventive intermittent programming, and the PER 24 undergoes a physical change during this window of opportunity; in particular, the PER 24 undergoes a change of state from liquid to solid during this cure window. The nature and degree of the responsiveness of a PER 24 region to electrification may vary in accordance with the nature and degree of the physical change of the PER 24.

In this regard, reference is again made to FIG 2. Let us suppose that, after mixing PER 24 and pouring PER 24 into a mold, the casting PER 24 begins to cross-link and polymerize and thus begins to solidify. The amount of cross-linking (and thus solidification) is dependent upon the extent of the polymerization reaction. Shortly after commencement of the cure window (e.g., one minute), only a small percentage (e.g., 1%) of the reactants in PER 24 have reacted and cross-linked. At this stage in the cure window, since cross-linking has only slightly occurred, PER 24 would typically remain substantially fluid. Much later after commencement of the cure window (e.g., thirty minutes), a much larger percentage (e.g., 65%) of the reactants in PER 24 have reacted and cross-linked. At this stage in the cure window, since cross-linking has occurred to a much more significant extent, PER 24 would typically become much more viscous; depending upon the PER 24, the PER 24 has more or less begun to harden. Due to the high viscosity of the PER 24, bubbles forming within PER 24 and tending to rise to the top of the PER 24 largely fail to escape into the atmosphere. The bubbles which form begin to expand as PER 24 is heated by means of a controlled voltage-and-current which is generated by power supply 20. It should be noted that, in practicing some inventive embodiments, the increase in temperature of the PER 24 may also be attributable to exothermic chemical reactions within the PER 24 and/or to additional heating from one or more other sources. Nevertheless, the inventive principle generally obtains that (i) the amount of electrical power which is applied to and through the PER 24, and (ii) the extent to which solidification of the PER 24 has occurred, essentially determine the characteristics of the bubbling phenomenon; more specifically, aspects such as the (electrically induced) forming of the bubbles, the blowing and expansion of the bubbles due to heat, and the subsequent capturing of the bubbles with the PER 24, are primarily dictated by factors (i) and (ii).

Again with reference to FIG. 3 and also with reference to to FIG. 5A and FIG. 5B, assume that a practitioner is seeking to inventively accomplish double-region intermittence with respect to region $R_1$ and region $R_2$. In order to do so effectively, the practitioner must intelligently schedule such intermittence. For most inventive embodiments the practitioner would be unwise to perform as to one region a single time-step which takes up almost the entire cure window C, thereby leaving little time for performing a time-step as to the other region.

For instance, take the situation wherein the inventive practitioner seeks to use one power supply, e.g., power supply 20, so as to inventively program two different regions with one or more different respective end-product properties, e.g., density and compressibility. As shown in FIG. 5A, after the practitioner mixes PER 24 and pours it into the mold, using power supply 20 the practitioner electrifies region $R_1$ continuously for the intitial 95% of cure window C, which approximately defines the extent of the polymerization reaction. Then, using the same power supply 20, the practitioner performs a time-step as to region $R_2$; however, at the point in time at which the practitioner has begun to perform the time-step as to region $R_2$, the PER 24 has largely solidified. Therefore, the application of electrical power to region $R_2$ at this late stage in cure window C has left insufficient time for significantly affecting any of the end-product properties for region $R_2$; in other words, the "monopolization" by region $R_1$ of the first 95% of cure window c has left little or no opportunity to input electrical energy into region $R_2$ so as to effectively program one or more end-product properties into into region $R_2$. It is thus seen that, for most inventive embodiments, the time-step schedule shown in FIG. 5A is virtually ineffectual, at least with respect to region $R_2$.

More successful is the practitioner who adopts a different approach to double-region intermittence of region $R_1$ and region $R_2$. To elaborate, the practitioner should follow the inventive strategy that, for a plurality of regions, the alternation of smaller, more frequent time-steps will generally yield more favorable results. In inventive practice, such a strategy is generally more successful because it inherently tends toward optimization of the timing of the application of electrical power to each region. For each region, the power is most effectively applied while that region is undergoing cure and is most amenable or susceptible to inventive programming.

For instance, as shown in FIG. 5B, the time-steps for both regions are fragmented or segmented into smaller time-steps and systematically ordered so as to intermittently cover time periods which are much smaller than the duration covered by cure window c. The electrical power is intermittently applied to region $R_1$ and region $R_2$ in a regular schedule of ten sequential time-steps which alternate between region $R_1$ and region $R_2$. All the time-steps corresponding to a particular region are equal. Each of the five time-steps applied to region $R_1$ has a time period $p_1$. Each of the five time-steps applied to region $R_2$ has a time period $p_2$ which is less than $p_1$.

Generally speaking, therefore, it is an inventive "rule of thumb" that the practitioner should strive for smaller, more frequent time-steps for every region. Moreover, it is generally recommended for inventive practice that the comprehensive time-step schedule manifest an overall time-step periodicity which essentially ranges throughout cure window c. The electrical power is thus being applied in parallel fashion to every region so as to avoid, for any one region, the relegation of power application to any particular time portion of cure window c; hence, for each region the corresponding time-steps are essentially being spread throughout cure window c. Since PER 24 gradually changes state from liquid to solid over the course of cure window c, the practitioner who guides himself/herself accordingly may advantageously avert the undue concentration of electrification of a region within a time period during which that region is in a particular physical state.

Nevertheless, the inventive principle which favors more numerous time-steps of shorter duration has its limitations in practice. There is a "law of diminishing returns" with regard to this inventive principle. As the number of time-steps increases, eventually the point is reached wherein the incremental increase in the number of time-steps is not justified by the incremental value associated therewith. For one thing, the process of repeatedly switching power supply 20 from one region to another entails an escalation of effort. Furthermore, inventive testing has not demonstrated that, for purposes of programming material properties into a particular region, the application of electrical power to that region in, say, ten time-steps is appreciably more effective than such application in, say, five time-steps.

For some inventive embodiments, however, the guiding principles set forth hereinabove may, at least to some extent, give way to other considerations. The practitioner may deliberately schedule the intermittence in an overall mode or pattern which has few time-steps, or which is irregular, or which exhibits a different kind of regularity. For example, it may be efficient to minimize the total number of time-steps. Or, it may be beneficial to perform all the time-steps for one region at an earlier stage of cure window c and all the time-steps for another region at a later stage of cure window c. Or, it may be advantageous, for at least one region, to have unequal time-step durations corresponding to that region; for instance, it may be propitious, for each of one or more regions, to systematically decrease and/or increase the time-step durations as time progresses within cure window c. In any case, in the light of the disclosure herein, optimal or near-optimal time-step scheduling for a given inventive application should be within the capability of the ordinarily skilled artisan.

Accordingly, the present invention provides a methodology, using a single power supply during the cure of a programmable electroset composition, for intermittently energizing one or more various regions thereof, such that one or more end-product properties (or physical characteristics) of each energized region have been controllably altered during said cure. As previously described herein, each selected region can be inventively "programmed" to have one or more desired end-product properties (or physical characteristics).

The terms "end-product property" and "physical characteristic" are generally intended herein to synonymously refer to a physical or material property, characteristic or quality of a thing; as specifically used herein in the context of inventive electrosetting, the "thing" is an electrosettable compositional entity, and the physical or material property, characteristic or quality is one which is manifested upon the conclusion of the cure window during which the inventive electrosetting has been effectuated.

The methyldiisocyanate formulation is sold under the brand name known as "ISONATE 2143 L modified MDI," manufactured by the Dow Chemical Company, of Midland, Mich. ISONATE 2143 L includes the following ingredients by percent weight, listed in Table 1, below:

TABLE 1

| INGREDIENT NO. | INGREDIENT | CAS# | % W/W |
|---|---|---|---|
| 1. | diphenylmethane disocyanate (MDI) containing methylene bisphenyl isocyanate, cas# 000101-68-8 | cas# 026447-40-5 | 70–80% |
| 2. | diphenylmethane diisocyanate (homopolymer) | cas# 039310-05-9 | 20–30% |
| 3. | triethyl phosphate | cas# 000078-40-0 | <2% |

In inventive practice, the intermittent programming can be performed either via manually switching a single set of electrodes (connected to the power supply) for applying power from region to region, or (especially for plural-region intermittence) via corresponding a relay switch and a set of electrodes to each region. According to a regional correspondence system for effecting inventive intermittence, the timing can be either manual or automated; i.e., the series of relay switches can be either manually or electronically controlled. For a plural-regional correspondence system, a series of relay switches is connected to the power supply.

According to a regional correspondence system for effecting inventive intermittence, the relay switches sequentially are turned on (i.e., closed) and then turned off (i.e., opened), thereby applying a voltage-and-current to each region via the corresponding electrodes which are in circuit with the corresponding relay switch. The practitioner can utilize a timepiece (e.g., a watch, clock or stop-watch) for purposes of timing the time-steps and other temporal durations, or can utilize electronics (e.g., a computer) for automatically switching at scheduled intervals.

In testing performed by the U.S. Navy, a programmable electroset composition was prepared as follows: 6 grams of microcrystaline cellulose were added to 6 grams of honey, and these were mixed thoroughly. The resultant composition was then added to and mixed thoroughly with 60 grams of a-fluid component which is sold under the brand name "POLAMINE 1000." After this thorough mixing in of the POLAMINE 1000, 12 grams of a formulation of methyl diisocyanate were added and mixed.

It should be understood that the present invention is useful for all known programmable electroset compositions and is not limited in applicability to the specific formulations disclosed herein.

The microcrystalline cellulose was purchased under the catalogue name "PH 105" from the food and pharmaceutical division of the FMC Corporation in Delaware. Microcrystalline cellulose is commonly used in the tableting industry to make the binder material for pills and is readily purchasable from numerous commercial firms in the industry.

The fluid component know as POLAMINE 1000 is marketed by Air Products and Chemical, Inc. of Allentown, Pa. The chemical name of this substance is polypropylene glycol/ethylene glycol di-p-aminobenzoate. It is in the chemical family of oligomeric diamine.

Figure 6:
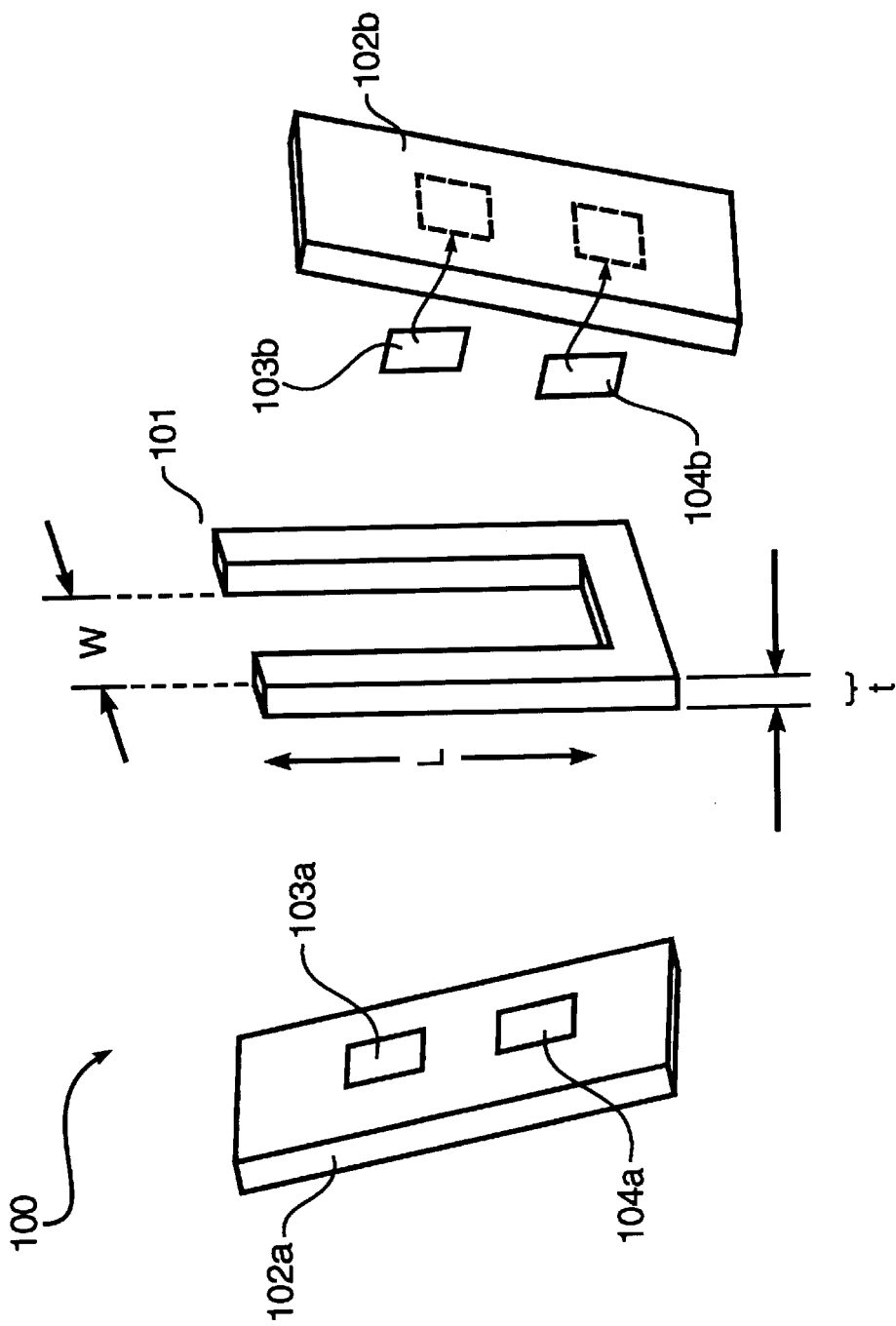
FIG. 6 is a diagrammatic perspective view of an embodiment of an electroset mold in accordance with the present invention.

Referring to FIG. 6, an electroset mold 100 as shown was used to manufacture an article via inventive intermittent programming. Electroset mold 100 included an electrically nonconductive component (shaped like the English letter "U") 101, plastic substrates 102a and 102b and electrodes 103a, 103b, 104a and 104b.

In inventive practice, electrodes such as electrodes 103a, 103b, 104a and 104b can comprise any good electrically conductive material, such as aluminum, steel, gold, copper, silver, etc. In this example, electrodes 103a, 103b, 104a and 104b comprised aluminum foil that was taped to substrates 102a and 102b. The aluminum foil was produced by the Reynolds Aluminum company and was purchased at a local Giant Food store.

In inventive practice, substrates such as substrates 102a and 102b can comprise any good nonporous, solid, electrically nonconductive material such as cured polyester, cured polyurethane, any plastic or cured rubber material, etc. In this example, each of substrates 102a and 102b comprised a plastic sheet used in overhead viewgraphs. These plastic viewgraph sheets were manufactured by the 3M Company as transparency film, product item number PP2500. These were purchased from a local office supply store.

In inventive practice, component 101 can comprise any good nonporous, solid, electrically nonconductive material such as cured polyester, cured polyurethane, cured epoxy, plastic, cured rubber material or other suitable composite material. In this example, component 101 comprised several wooden paint stirrers (purchased with paint from the Hechinger's hardware store in Annapolis, Md.) and transparent, electrically nonconductive tape produced by the 3M Company. The tape is sold under the brand name SCOTCHGUARD. The wooden paint stirrers were taped together to form component 101 such that the nonconductive tape encapsulated the underlying wooden stirrers of component 101.

Aluminum foil electrodes 103a and 104a were taped onto substrate 102a in the position shown in FIG. 6 such that their conductive surfaces were exposed (i.e., facing the interior open channel of component 101). Similarly, aluminum foil electrodes 103b and 104b were taped onto substrate 102b in the position shown in FIG. 6 such that their conductive surfaces were exposed (i.e., facing the interior open channel of component 101). Each of electrodes 103a, 104a, 103b and 104b had an individual wire (not shown) extending from the respective electrode toward the upper edges of the substrates shown in FIG. 6. These wires were in good electrical contact with their respective electrodes but were electrically isolated from each other. The purpose of these wires was to permit the electrodes to be electrically connected to an electrical power supply.

In inventive practice, the dimensions of component 101 can vary from mold to mold, depending upon the desired result. The dimensions provided in this example are intended to more specifically illustrate how the particular article in the example was made as well as more generally illustrate the advantages associated with inventive intermittent programming, and should not be construed as in any way limiting the present invention.

After electrodes 103a, 104a, 103b and 104b (and their respective wires) were attached to substrates 102a and 102b, electroset mold 100 was constructed by taping substrates 102a and 102b to the opposing exterior flat surfaces of component 101. The same transparent tape was used for this purpose as was used for taping the electrodes onto the substrates. Substrates 102a and 102b, together with component 101, thus formed a container into which the uncured programmable electroset composition could be pored. The interior dimensions of the container were approximately as follows. t=0.7 inches; L=8 inches; w=6 inches. The exposed surface area of each of the electrodes was approximately 1 square inch; for each electrode, the length measured approximately 1 inch and the width measured approximately 1 inch.

With reference to FIG. 7A, FIG. 7B, FIG. 7B and FIG. 7D, in order to apply to mold 100 the appropriate voltage-and-current for the appropriate time-step, a knifeswitch 117 was used. As shown in FIG. 7B, the movable component of the knifeswitch included electrode bars 112 to which was attached an electrically nonconductive handle 111. As shown in FIG. 7A, the movable component of the knifeswitch was connected to electrically nonconductive base 113 by means of a hinge. Movable handle 111 could be manually swung on the hinge into the "closed position" so as to cause each of the electrode bars to electrically connect to electrode connection 110, as shown in FIG. 7C. Alternatively, as shown in FIG. 7D, movable handle 111 could be manually swung into the "open" position by swinging the handle away from connections 110, thereby electrically isolating electrode bars 112 from any and all of the electrical connections 110.

Figure 8:
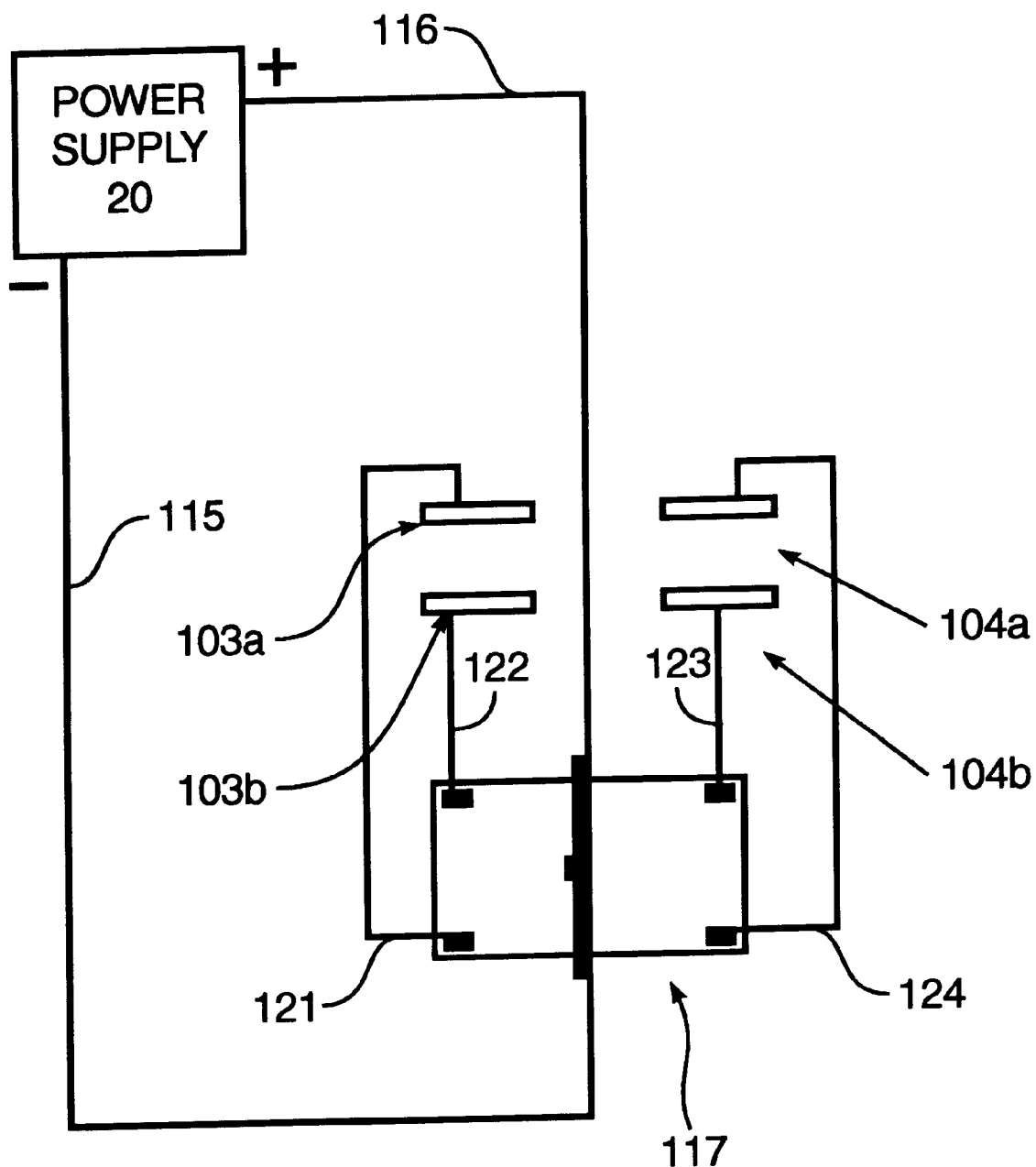
FIG. 8 is a diagrammatic representation of an embodiment of a manual intermittent programming arrangement in accordance with the present invention.

Referring to FIG. 8, knifeswitch 117 was electrically connected to power supply 20 and to electrodes 103a, 103b, 104a and 104b as shown. Each of the electrode bars 112 was electrically connected to the output of power supply 20; one electrode bar 112 was connected to the positive output electrode of power supply 20, the other electrode bar 112 was connected to the negative output electrode of power supply 20. As shown in FIG. 8, this was facilitated by connecting wires 115 and 116 to the knifeswitch electrode bars 112 and to power supply 20.

Still referring to FIG. 8, electrode 103a was electrically attached to one electrode connector 110 via wire 121. Electrode 103b was electrically attached to a separate electrode connector 110 via wire 122. Electrode 104a was electrically attached to another separate electrode connector 110 via wire 124. Electrode 104b was electrically attached to yet another separate electrode connector 110 via wire 123.

In inventive practice, power supply 20 can comprise any suitable AC power supply or, alternatively, DC power supply. In this example, power supply 20 was a Glassman DC high voltage power supply, LX series, model number PS/LX030P066-11, serial number M783713-01AH941005 manufactured by Glassman High Voltage of Whitehouse Station, N.J. This power supply features the ability to independently limit the output voltage and output current. Such a high voltage power supply is disclosed, e.g., by Reitz U.S. Pat. No. 5,518,664, aforementioned and incorporated herein by reference.

Continuing with this example, the Navy performed in two control modes the afore-discussed inventive testing with respect to the above-described programmable electroset composition; that is, the Navy practiced inventive intermittent programming using manual control and also practiced inventive intermittent programming using automated control. In the light of the instant disclosure, the ordinarily skilled artisan will appreciate that inventive intermittent programming can be performed in a variety of ways by effectuating manual control, and can be performed in a variety of ways by effectuating automatic control (e.g., by means of an automated, computer-controlled system).

Figure 9A:
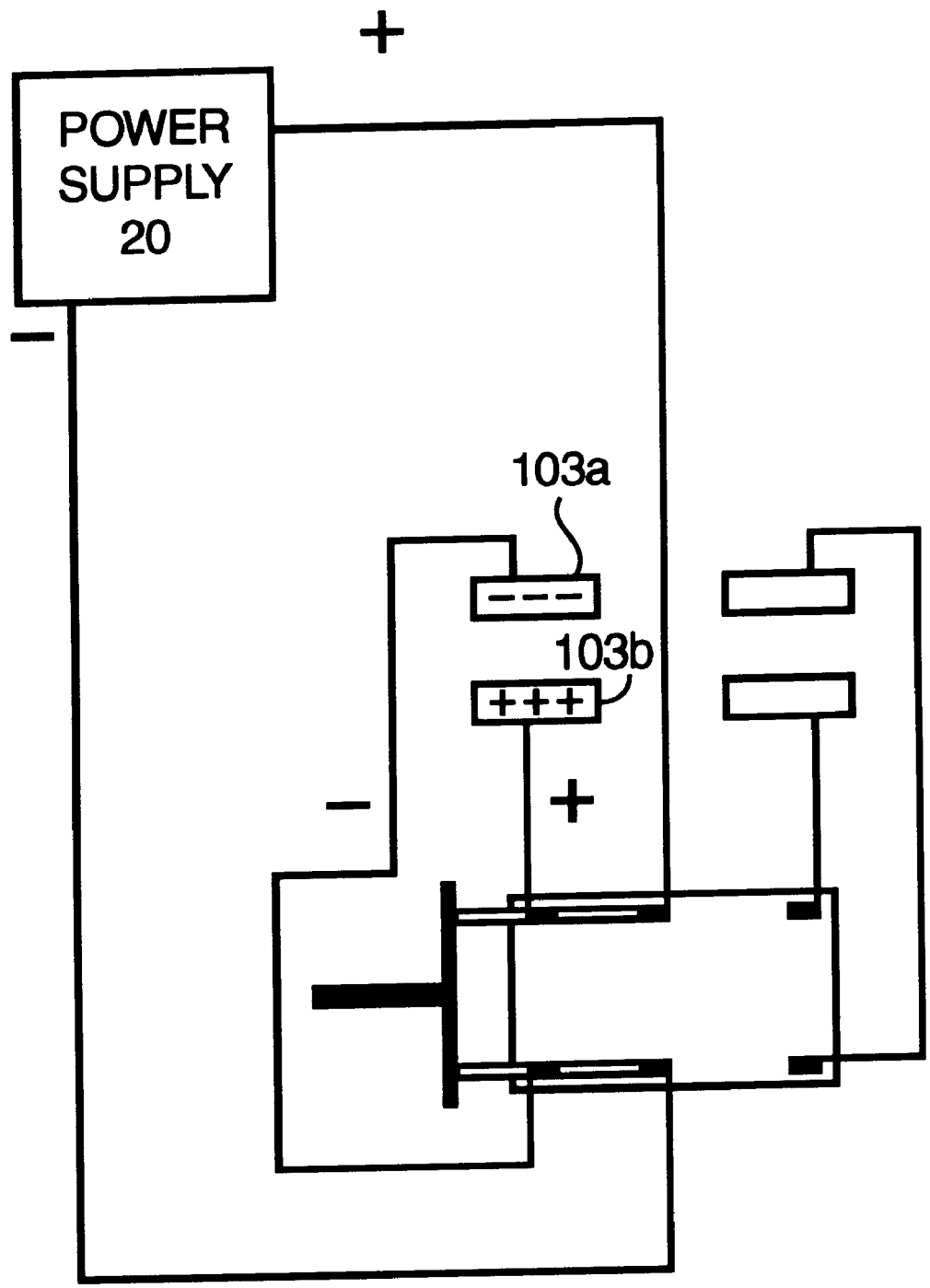
FIG. 9A is a diagrammatic representation which illustrates, using the arrangement shown in FIG. 8, the supplying of electrical power to a region of an electrosettable compositional entity.
Figure 9B:
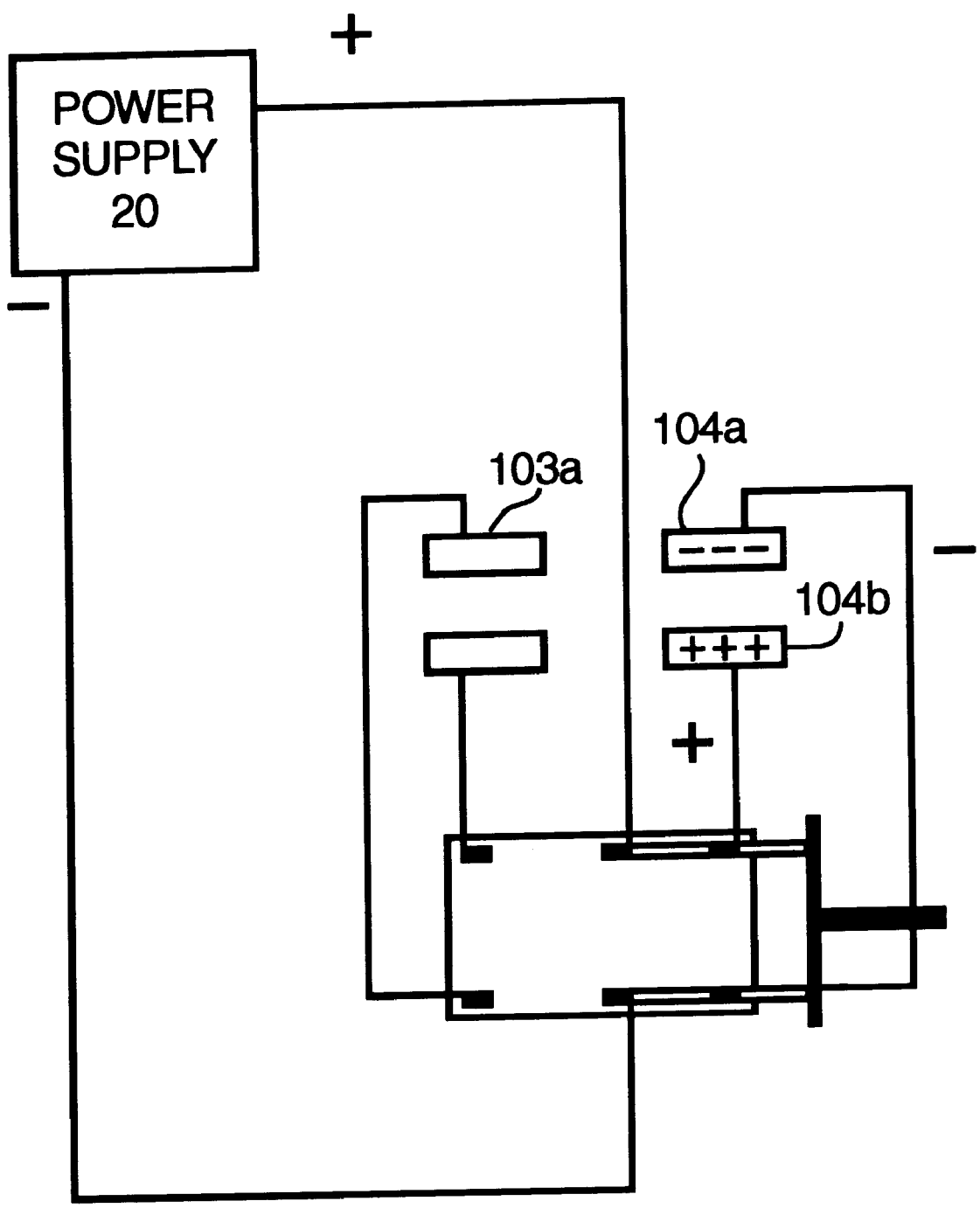
FIG. 9B is a diagrammatic representation, similar to FIG. 9A, which illustrates, using the arrangement shown in FIG. 8, the supplying of electrical power to another region of the same electrosettable compositional entity.
Figure 10:
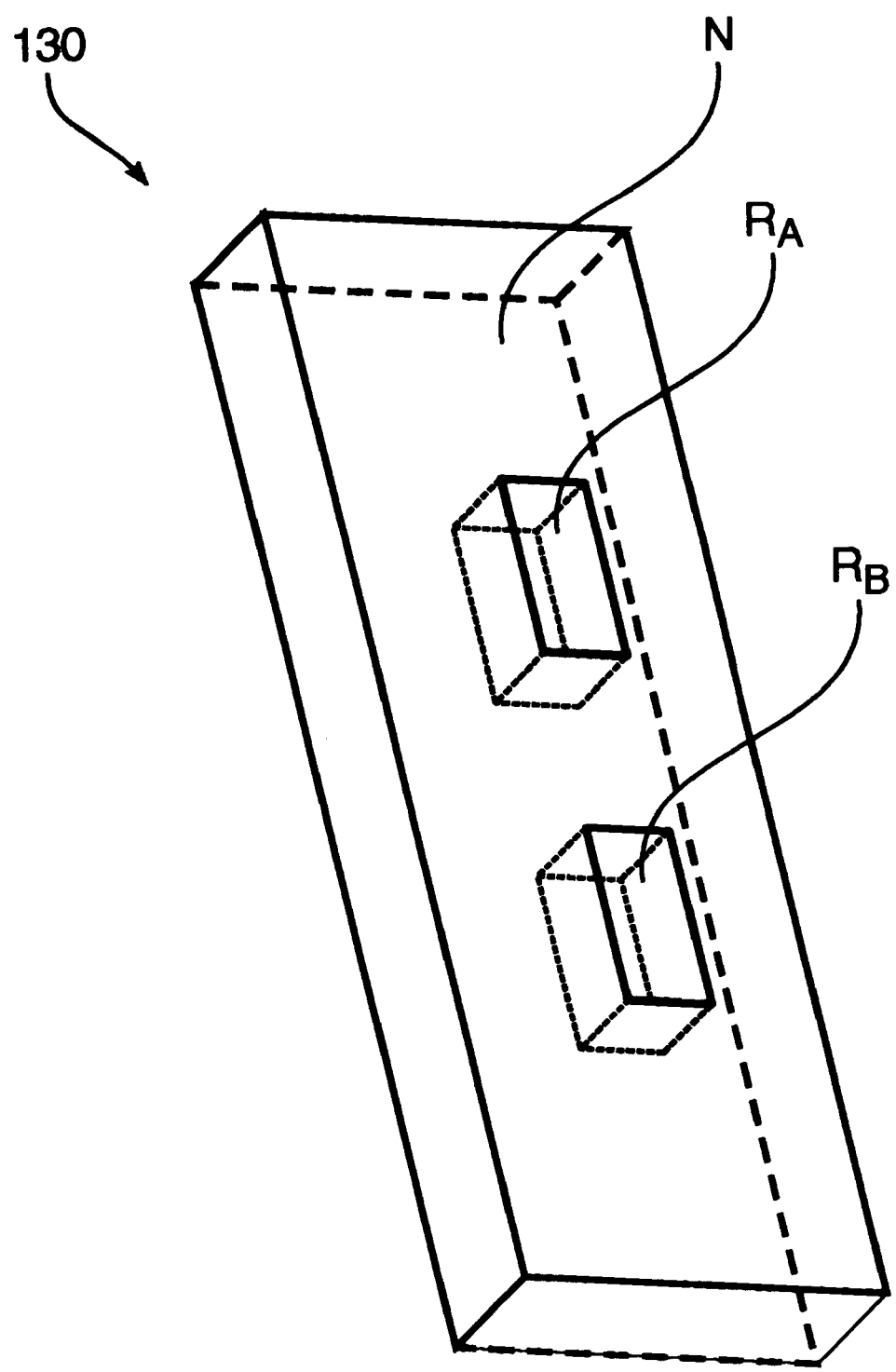
FIG. 10 is a diagrammatic elevation view of an article which, using the arrangement shown in FIG. 8, has been inventively programmed with different regions of density.

Still referring to FIG. 8 and also referring to FIG. 9A, FIG. 9B and FIG. 10, according to the inventive intermittent programming using manual control, the programmable electroset composition was mixed and poured into mold 100 while the electrical connections were as shown in FIG. 8. Power supply 20 was set with a maximum voltage output of 6 kilovolts (KV) and a maximum current output of 3 milliamps.

After the composition was poured into the mold, knifeswitch 117 was manually closed in the position shown in FIG. 9B, thus allowing electrodes 104a and 104b to be energized; this condition was maintained for a period of 45 seconds. After this, knifeswitch 117 was manually opened and then closed in the position shown in FIG. 9A, thus allowing electrodes 103a and 103b to be energized; this condition was maintained for a period of 90 seconds. After this, knifeswitch 117 was manually opened and then returned to the position shown in FIG. 9B; this condition was maintained for a period of 45 seconds. After this, knifeswitch 117 was manually opened and then returned to the position shown in FIG. 9A; this condition was maintained for a period of 90 seconds.

Thereafter, for a period of 30 minutes, knifeswitch 117 was repeatedly manually alternated between the conditions shown in FIG. 9B and FIG. 9A (i.e., first the condition shown in FIG. 9B and then the condition shown in FIG. 9A). Each time the condition shown in FIG. 9B was established, the power was applied for 45 seconds. Each time the condition shown in FIG. 9A was established, the power was applied for 90 seconds.

After 30 minutes, power supply 20 was turned off and the mold was electrically disconnected from the knifeswitch. The mold was permitted to stand for a period of 20 hours. Afterward, the molded article 130, shown in FIG. 10, was removed.

Article 130 was examined by manually squeezing each of three regions thereof, viz., selected region $R_A$ (the region which had been energized as shown in FIG. 9A), selected region $R_B$ (the region which had been energized as shown in FIG. 9B), and nonselected region N (the region which had not been energized at all). Nonselected region N essentially constituted the remaining portion of article 130 other than selected region $R_A$ and selected region $R_B$. Compared manually, region $R_A$ felt much more compressible than did region $R_B$. Furthermore, both region $R_A$ and region $R_B$ felt much more compressible than did the nonelectrified region N. After these comparative compressibilities were ascertained, region $R_A$ and region $R_B$ were removed from (i.e., cut out of) article 130. The specific gravity of the unenergized portion (i.e., region N) of article 130 was found to be about 0.99 grams per cubic centimeter (i.e., 0.99 g/cc), whereas the specific gravities of region $R_A$ and region $R_B$ were found to be about 0.65 g/cc and about 0.78 g/cc, respectively.

Figure 11:
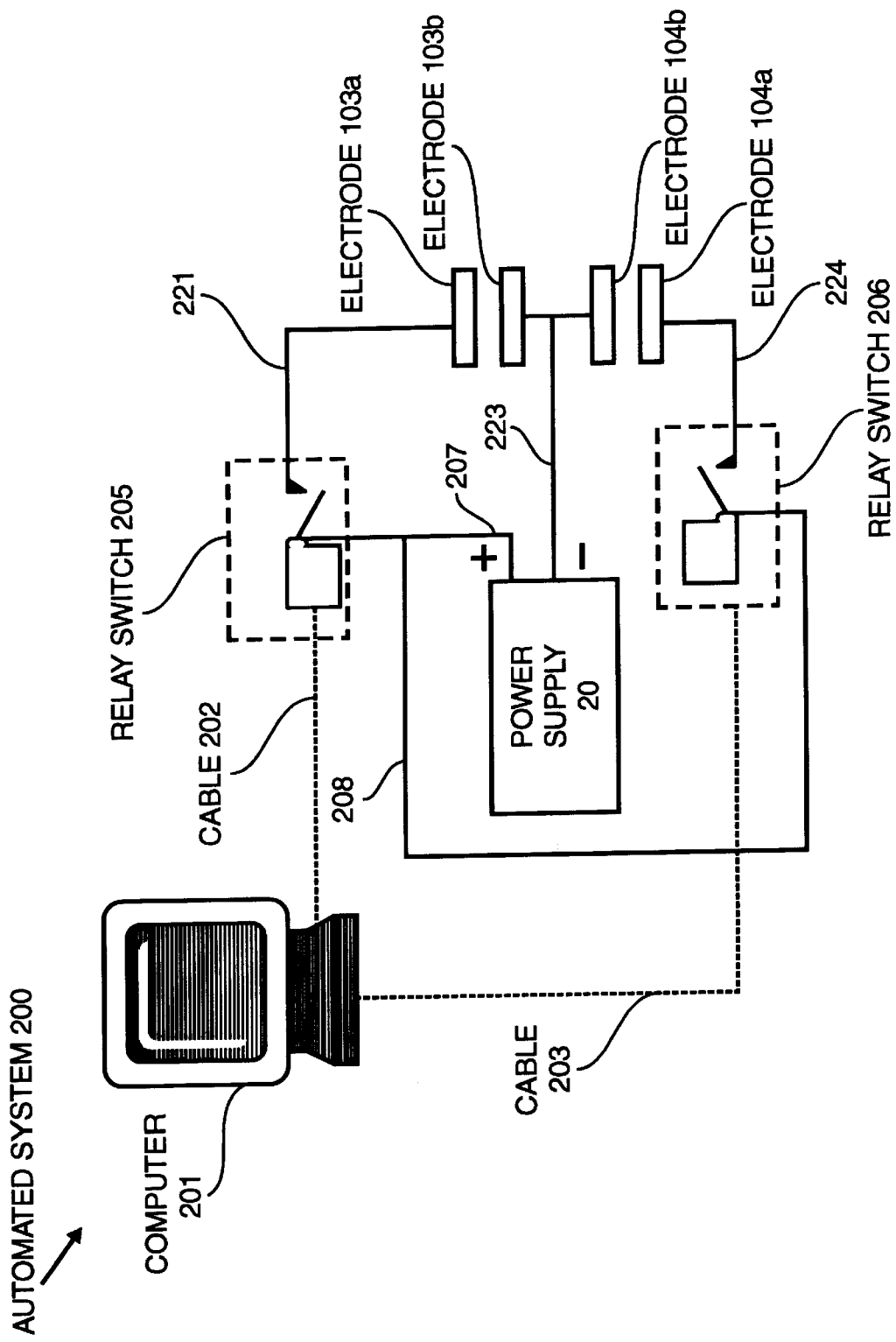
FIG. 11 is a diagrammatic representation of an embodiment of an automatic intermittent programming arrangement in accordance with the present invention.

Now referring to FIG. 11, automated system 200 includes computer 201, cables 202 and 203, relay switches 205 and 206, power supply 20, wires 207, 208, 221, 223 and 224, and (as shown in FIG. 8) electrodes 103a, 103b, 104a and 104b. In inventive practice, computer 201 can be any computer capable of controlling external relay switches As shown in FIG. 11, computer 201 is connected to relay switches 205 and 206 via computer cables 202 and 203, respectively. The negative polarity output of power supply 20 is connected to electrodes 103b and 104b. Relay switches 205 and 206 are electrically connected to the positive polarity output of power supply 20 via wires 207 and 208, respectively.

When relay switch 205 is closed, it electrically connects electrode 103a to the positive polarity output of power supply 20 via wires 207 and 221. When relay switch 205 is open, wire 221 is electrically disconnected from wire 207 and therefore electrode 103a cannot be electrically energized by power supply 20. When relay switch 206 is closed, it electrically connects electrode 104a to the positive polarity output of power supply 20 via wires 207, 208 and 224. When relay switch 206 is open, wire 224 is electrically disconnected from wire 208 and therefore electrode 104a cannot be electrically energized by power supply 20. In operation, computer 201 can be programmed to open and close relay switches 205 and 206 at desired time-step intervals.

Figure 12:
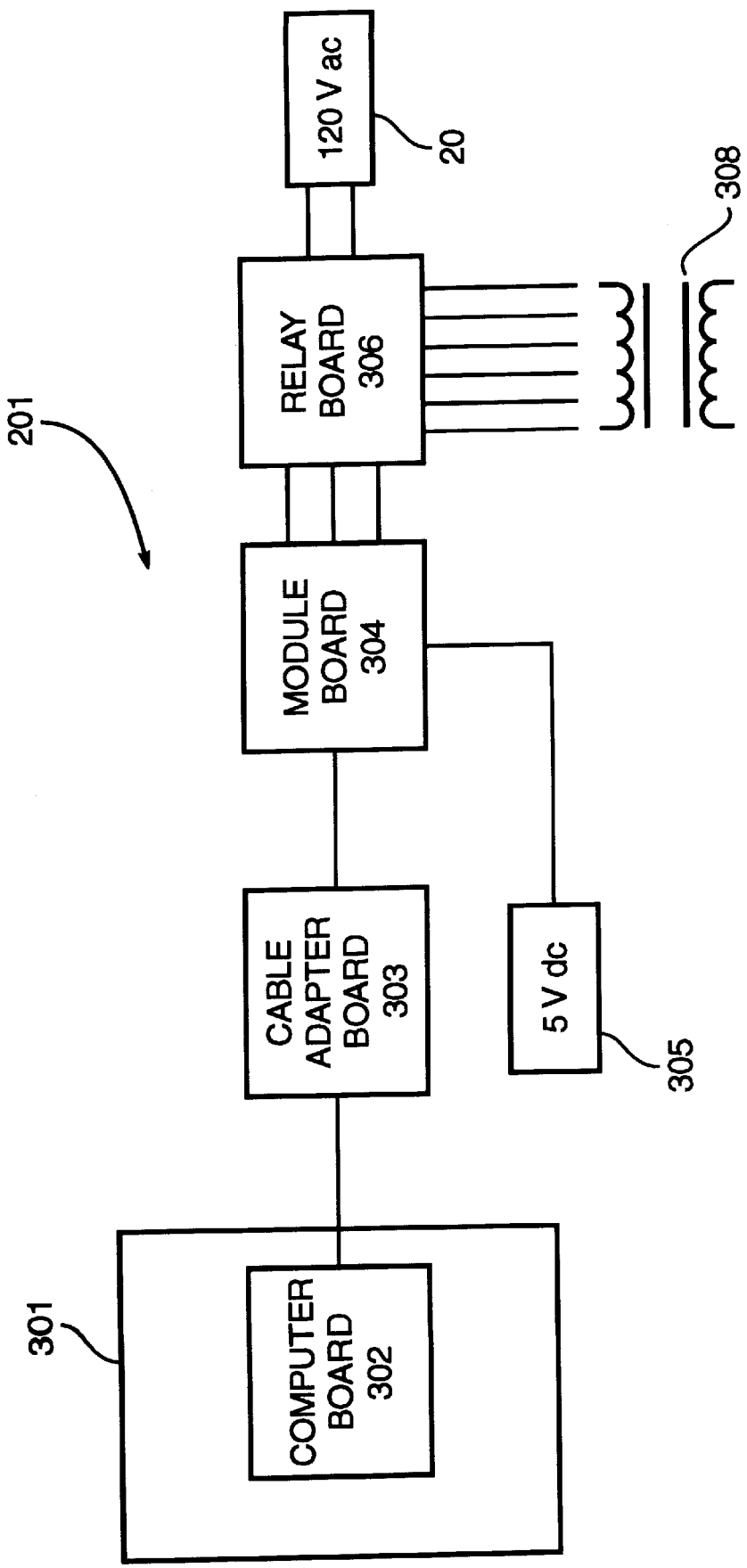
FIG. 12 is a diagrammatic representation of an embodiment of a computer system which can be used in association with an inventive automatic intermittent programming arrangement such as shown in FIG. 11.

Reference now being made to FIG. 12, for purposes of effecting automatic control of inventive intermittent programming, the U.S. Navy implemented a computer system 201 which included computer case 301, computer (printed circuit) board 302, cable adapter (printed circuit) board 303, module (printed circuit) board 304, module power supply 305, relay (printed circuit) board 306, power supply 20 and voltage transformers 308. Computer board 302, cable adapter board 303, module board 304, module power supply 305, relay board 306, power supply 20 and transformers 308 were connected as shown.

Computer board 302, situated inside computer case 301, was a PC-DIO-24 No. 776247-01. Cable adapter board 303, situated on a wooden board attached at the back of computer case 301, was an SC-2052, ASSY180920-01, Rev. A S/N (S/N 00100), copyright 1989, manufactured by National Instruments. Module board 304, powered by 5 V DC module power supply 305 and situated at the front of computer case 301, was a PB-8H manufactured by Gordos. The modules on module board 304 were each an SSR-OAC5. Relay board 306 had four 120 V AC relays manufactured by Potter & Brumfield; each relay was a KUP-11A15-120, 120 V 50/60 Hz, industrial rated 3A, ½ HP, 606 V AC; ⅓ HP, 120 V AC; 10 A, 240 V AC. power supply 20 was an AC power supply, 120 V AC digital power, manufactured by Elgar, Model 501 SL, Elgar Series 9012. Three voltage transformers 308 were used, each transformer a PRI 4200 V, 35:1 BIL 45 KV, 60 Hz 0.3 X, 600 VA at 30° C., PT 3-2-45-422FF, manufactured by Flex Core.

The possibilities of application of the present invention are diverse and multitudinous. There is virtually an infinite variety of inventive embodiments. Depending upon the applicational requirements, the inventive practitioner multifariously can select, adjust and/or determine any of several variables, such as (i) the operational parameters of the time-step schedules, and/or (ii) the dimensions, configurations and/or end-product properties of the selected and/or nonselected regions of the electrosettable compositional entities.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A process for programming at least one physical characteristic into a partial region of an electrosettable compositional entity, said process comprising:

providing said electrosettable compositional entity in an uncured state;

curing said electrosettable compositional entity; and during said curing, intermittently applying electrical power to said partial region;

each said physical characteristic being selected from the group of physical characteristics consisting of density, compressibility, hardness, electrical resistivity, buoyancy, smoothness, adhesion and shape;

said electrosettable compositional entity comprising a phase changing vehicle and an aggregate, said phase changing vehicle being both a dielectric and a polymer, said aggregate comprising particles which will polarize in an electric field.

2. A process for programming at least one physical characteristic into at least two regions of an electrosettable compositional entity, said process comprising:

providing said electrosettable compositional entity in an uncured state;

curing said electrosettable compositional entity; and during said curing, intermittently applying electrical power to said at least two regions;

wherein each said physical characteristic is selected from the group of physical characteristics consisting of density, compressibility, hardness, electrical resistivity, buoyancy, smoothness, adhesion and shape;

wherein said electrosettable compositional entity comprises a phase changing vehicle and an aggregate, said phase changing vehicle being both a dielectric and a polymer, said aggregate comprising particles which will polarize in an electric field; and wherein said intermittently applying is both interregionally repetitive and intraregionally repetitive.

3. A process for programming as in claim 2, wherein at least two said regions are materially/qualitatively distinctive.

4. A process for programming as in claim 3, wherein at least one said region is unique.

5. A process for programming as in claim 2, wherein each said region is a partial region.

6. A process for programming as in claim 5, wherein at least two said partial regions are locationally discrete, thereby not intersecting.

7. A process for programming as in claim 6, wherein at least one said partial region is unique.

8. A process for programming as in claim 5, wherein at least two said partial regions are materially/qualitatively distinctive.

9. A process for programming as in claim 8, wherein at least one said partial region is unique.

10. A process for programming as in claim 5, wherein at least two said partial regions are locationally distinct, thereby intersecting.

11. A process for programming as in claim 10, wherein at least two said locationally distinct regions incompletely intersect.

12. A process for programming as in claim 10, wherein at least two said locationally distinct regions completely intersect.

13. A process for programming as in claim 2, wherein one said region is a global region and at least one said region is a partial region.

14. A process for programming as in claim 2, wherein said at least two regions are at least three said regions, at least two said regions being partial regions.

15. A process for programming at least one physical characteristic into at least two regions of an electrosettable compositional entity, said process comprising:

prov14ing said electrosettable compositional entity in an uncured state;

curing said electrosettable compositional entity; and during said curing, intermittently applying electrical power to said at least two regions;

wherein each said physical characteristic is selected from the group of physical characteristics consisting of density, compressibility, hardness, electrical resistivity, buoyancy, smoothness, adhesion and shape;

wherein said electrosettable compositional entity comprises a phase changing vehicle and an aggregate, said phase changing vehicle being both a dielectric and a polymer, said aggregate comprising particles which will polarize in an electric field; and wherein one said region is a global region and at least one said region is a partial region.

16. A process for programming as in claim 15, wherein said intermittently applying is interregionally repetitive but not intraregionally repetitive.

17. A process for programming as in claim 15, wherein said intermittently applying is both interregionally repetitive and intraregionally repetitive.

18. A process for programming as in claim 15, wherein at least two said regions are materially/qualitatively distinctive.

19. A process for programming as in claim 18, wherein said intermittently applying is interregionally repetitive but not intraregionally repetitive.

20. A process for programming as in claim 18, wherein said intermittently applying is both interregionally repetitive and intraregionally repetitive.

21. A process for programming as in claim 15, wherein said at least two regions are at least three said regions, at least two said regions being partial regions.

22. A process for curing an electroset composition so as to alter, for at least one region of said electroset composition, at least one end-product property selected from the group of end-product properties consisting of density, compressibility, hardness, electrical resistivity, buoyancy, smoothness, adhesion and shape, said process comprising:

providing a quantity of said electroset composition, in an uncured state, said electroset composition comprising a phase changing vehicle and an aggregate, said phase changing vehicle being both a dielectric and a polymer, said aggregate comprising particles which will polarize in an electric field;

selecting a partial said region of said electroset composition;

positioning said partial said region between at least two electrically conductive substrates;

charging said electrically conductive substrates, thereby exposing said partial said region to a said electric field;

maintaining said charging so as to establish an electric current within said partial said region;

ceasing said charging; and with respect to said partial said region, at least once repeating said steps of charging, maintaining and ceasing;

whereby, when said electroset composition is in a cured state, for said partial said region at least one said end-product property is altered by at least 5% with respect to said end-product property which would be obtained for said partial said region, when said electroset composition is in a cured state, by a process for curing said electroset composition which does not include said charging;

whereby, for said end-product property being selected from the group of end-product properties consisting of density, compressibility, hardness, electrical resistivity and buoyancy, said alteration is a function of the amount of said electric current within said partial said region;

whereby, for said end-product property being selected from the group of end-product properties consisting of smoothness and adhesion, said alteration is an anisotropic function of said positioning of said partial said region with respect to said electrically conductive substrates; and whereby, for said end-product property being shape, said positioning includes placing at least a portion of said electroset composition in an electric mold which includes said electrically conductive substrates, said at least a portion includes said partial said region, and said alteration is a function of the configuration of said electric mold.

23. A process for curing an electroset composition as in claim 22, wherein said partial said region is a first said region, said process comprising:

selecting a second said region of said electroset composition;

positioning said second said region between at least two electrically conductive substrates;

charging said electrically conductive substrates, thereby exposing said second said region to a said electric field;

maintaining said charging so as to establish an electric current within said second said region; and ceasing said charging;

whereby, when said electroset composition is in a cured state, for said second said region at least one said end-product property is altered by at least 5% with respect to said end-product property which would be obtained for said second said region, when said electroset composition is in a cured state, by a process for curing said electroset composition which does not include said charging;

whereby, for said end-product property being selected from the group of end-product properties consisting of density, compressibility, hardness, electrical resistivity and buoyancy, said alteration is a function of the amount of said electric current within said second said region;

whereby, for said end-product property being selected from the group of end-product properties consisting of smoothness and adhesion, said alteration is an anisotropic function of said positioning of said second said region with respect to said electrically conductive substrates; and whereby, for said end-product property being shape, said positioning includes placing at least a portion of said electroset composition in an electric mold which includes said electrically conductive substrates, said at least a portion includes said second said region, and said alteration is a function of the configuration of said electric mold.

24. A process for curing an electroset composition as in claim 22, wherein said partial said region is a first said region, said process comprising:

selecting a second said region of said electroset composition;

positioning said second said region between at least two electrically conductive substrates;

charging said electrically conductive substrates, thereby exposing said second said region to a said electric field;

maintaining said charging in association with said second said region, so as to establish an electric current within said second said region;

ceasing said charging in association with said second said region; and with respect to said second said region, at least once repeating said steps of charging, maintaining and ceasing;

whereby, when said electroset composition is in a cured state, for said second said region at least one said end-product property is altered by at least 5% with respect to said end-product property which would be obtained for said second said region, when said electroset composition is in a cured state, by a process for curing said electroset composition which does not include said charging;

whereby, for said end-product property being selected from the group of end-product properties consisting of density, compressibility, hardness, electrical resistivity and buoyancy, said alteration is a function of the amount of said electric current within said second said region;

whereby, for said end-product property being selected from the group of end-product properties consisting of smoothness and adhesion, said alteration is an anisotropic function of said positioning of said second said region with respect to said electrically conductive substrates; and whereby, for said end-product property being shape, said positioning includes placing at least a portion of said electroset composition in an electric mold which includes said electrically conductive substrates, said at least a portion includes said second said region, and said alteration is a function of the configuration of said electric mold.

25. A process for altering, for at least one region of a cured electroset article, at least one physical characteristic selected from the group of physical characteristics consisting of density, compressibility, hardness, electrical resistivity, buoyancy, smoothness, adhesion and shape, said process comprising:

providing an electroset material in an uncured state, said electroset material having an electrically activated blowing agent dispersed therein, said electroset composition comprising a phase changing vehicle and an aggregate, said phase changing vehicle being both a dielectric and a polymer, said aggregate comprising particles which will polarize in an electric field;

curing said electroset material; and during said curing, intermittently applying to at least one said region an electric field sufficient to activate said blowing agent, said intermittently applying being intraregionally repetitive with respect to at least one said region which is a partial said region;

whereby, for said end-product property being selected from the group of end-product properties consisting of density, compressibility, hardness, electrical resistivity and buoyancy, said altering is a function of the amount, within said region, of electric current associated with said electric field;

whereby, for said end-product property being selected from the group of end-product properties consisting of smoothness and adhesion, said altering is an anisotropic function of the situation of said region with respect to said electric field; and whereby, for said end-product property being shape, said altering includes placing at least a portion of said electroset material in an electric mold, said at least a portion includes said region, and said altering is a function of the configuration of said electric mold.

26. A process for curing an electroset composition so as to alter, for at least two regions of said electroset composition, at least one end-product property selected from the group of end-product properties consisting of density, compressibility, hardness, electrical resistivity, buoyancy, smoothness, adhesion and shape, said process comprising:

providing a quantity of said electroset composition, in an uncured state, said electroset composition comprising a phase changing vehicle and an aggregate, said phase changing vehicle being both a dielectric and a polymer, said aggregate comprising particles which will polarize in an electric field;

selecting a partial said region of said electroset composition;

positioning said partial said region between at least two electrically conductive substrates;

charging said electrically conductive substrates, thereby exposing said partial said region to a said electric field;

maintaining said charging in association with said partial said region, so as to establish an electric current within said partial said region;

ceasing said charging in association with said partial said region;

positioning a global said region of said electroset composition between at least two electrically conductive substrates;

charging said electrically conductive substrates, thereby exposing said global said region to a said electric field;

maintaining said charging in association with said global said region, so as to establish an electric current within said global said region;

ceasing said charging in association with said global said region;

whereby, when said electroset composition is in a cured state, for said partial said region at least one said end-product property is altered by at least 5% with respect to said end-product property which would be obtained for said partial said region, when said electroset composition is in a cured state, by a process for curing said electroset composition which does not include said charging;

whereby, for said end-product property being selected from the group of end-product properties consisting of density, compressibility, hardness, electrical resistivity and buoyancy, said alteration is a function of the amount of said electric current within said partial said region;

whereby, for said end-product property being selected from the group of end-product properties consisting of smoothness and adhesion, said alteration is an anisotropic function of said positioning of said partial said region with respect to said electrically conductive substrates;

whereby, for said end-product property being shape, said positioning includes placing at least a portion of said electroset composition in an electric mold which includes said electrically conductive substrates, said at least a portion includes said partial said region, and said alteration is a function of the configuration of said electric mold;

whereby, when said electroset composition is in a cured state, for said global said region at least one said end-product property is altered by at least 5% with respect to said end-product property which would be obtained for said partial said region, when said electroset composition is in a cured state, by a process for curing said electroset composition which does not include said charging;

whereby, for said end-product property being selected from the group of end-product properties consisting of density, compressibility, hardness, electrical resistivity and buoyancy, said alteration is a function of the amount of said electric current within said global said region;

whereby, for said end-product property being selected from the group of end-product properties consisting of smoothness and adhesion, said alteration is an anisotropic function of said positioning of said global said region with respect to said electrically conductive substrates; and whereby, for said end-product property being shape, said positioning includes placing at least a portion of said electroset composition in an electric mold which includes said electrically conductive substrates, said at least a portion includes said global said region, and said alteration is a function of the configuration of said electric mold.

27. A process for altering, for each of at least two regions of a cured electroset article, at least one physical characteristic selected from the group of physical characteristics consisting of density, compressibility, hardness, electrical resistivity, buoyancy, smoothness, adhesion and shape, said at least two regions consisting of a global region and at least one partial region, said process comprising:

providing an electroset material in an uncured state, said electroset material having an electrically activated blowing agent dispersed therein, said electroset composition comprising a phase changing vehicle and an aggregate, said phase changing vehicle being both a dielectric and a polymer, said aggregate comprising particles which will polarize in an electric field;

curing said electroset material; and during said curing, intermittently applying to said at least two regions an electric field sufficient to activate said blowing agent;

wherein, with respect to each of said at least two regions:
for said end-product property being selected from the group of end-product properties consisting of density, compressibility, hardness, electrical resistivity and buoyancy, said altering is a function of the amount, within said region, of electric current associated with said electric field;

for said end-product property being selected from the group of end-product properties consisting of smoothness and adhesion, said altering is an anisotropic function of the situation of said region with respect to said electric field; and for said end-product property being shape, said altering includes placing at least a portion of said electroset material in an electric mold, said at least a portion includes said region, and said altering is a function of the configuration of said electric mold.

* * * * *